United States Patent
Arena et al.

(10) Patent No.: US 9,184,424 B2
(45) Date of Patent: Nov. 10, 2015

(54) BATTERY ASSEMBLY

(71) Applicant: LG Chem, Ltd., Seoul (KR)

(72) Inventors: Anthony Arena, Macomb, MI (US); Daniel Sanderson, Rochester Hills, MI (US)

(73) Assignee: LG Chem, Ltd., Seoul (KR)

( * ) Notice: Subject to any disclaimer, the term of this patent is extended or adjusted under 35 U.S.C. 154(b) by 241 days.

(21) Appl. No.: 13/936,556

(22) Filed: Jul. 8, 2013

(65) Prior Publication Data

US 2015/0010801 A1    Jan. 8, 2015

(51) Int. Cl.
| | |
|---|---|
| *H01M 2/10* | (2006.01) |
| *H01M 10/647* | (2014.01) |
| *H01M 10/6557* | (2014.01) |
| *H01M 10/6555* | (2014.01) |
| *H01M 10/6561* | (2014.01) |
| *H01M 10/613* | (2014.01) |
| *H01M 10/04* | (2006.01) |
| *H01M 2/20* | (2006.01) |

(52) U.S. Cl.
CPC ............. *H01M 2/10* (2013.01); *H01M 10/613* (2015.04); *H01M 10/647* (2015.04); *H01M 10/6555* (2015.04); *H01M 10/6557* (2015.04); *H01M 10/6561* (2015.04); *H01M 2/202* (2013.01); *H01M 10/0486* (2013.01)

(58) Field of Classification Search
CPC .................................................. H01M 10/0486
See application file for complete search history.

(56) References Cited

U.S. PATENT DOCUMENTS

| | | | |
|---|---|---|---|
| 1,587,425 | A | 6/1926 | Otto |
| 2,273,244 | A | 2/1942 | Cornelius |
| 2,391,859 | A | 1/1946 | Earl |
| 3,503,558 | A | 3/1970 | Galiulo et al. |
| 3,522,100 | A | 7/1970 | Lindstrom |
| 3,550,681 | A | 12/1970 | Stier et al. |
| 3,964,930 | A | 6/1976 | Reiser |
| 4,009,752 | A | 3/1977 | Wilson |
| 4,063,590 | A | 12/1977 | Mcconnell |
| 4,298,904 | A | 11/1981 | Koenig |
| 4,305,456 | A | 12/1981 | Mueller et al. |

(Continued)

FOREIGN PATENT DOCUMENTS

| | | |
|---|---|---|
| CN | 1385917 A | 12/2002 |
| CN | 101101997 A | 1/2008 |

(Continued)

OTHER PUBLICATIONS

"Gasket". Merriam-Webster. Merriam-Webster. Web. May 30, 2012. <http://www.merriam-webster.com/dictionary/gasket>.

(Continued)

*Primary Examiner* — Jane Rhee
(74) *Attorney, Agent, or Firm* — Buckert Patent & Trademark Law Firm, PC; John F. Buckert

(57) ABSTRACT

A battery assembly includes a first battery frame assembly having a first plastic frame member and a first thermally conductive plate. The first plastic frame member has a rectangular ring-shaped peripheral wall and a plurality of cross-members. The battery assembly further includes a first thermally conductive plate having peripheral edges encapsulated within the first substantially rectangular ring-shaped peripheral wall. The plate further includes exposed portions configured to contact air passing through a first plurality of channels in the peripheral wall and past the first thermally conductive plate and through a second plurality of channels in the peripheral wall. The battery assembly further includes a first battery cell configured to contact the first thermally conductive plate.

14 Claims, 18 Drawing Sheets

(56) References Cited

U.S. PATENT DOCUMENTS

| | | |
|---|---|---|
| 4,322,776 A | 3/1982 | Job et al. |
| 4,444,994 A | 4/1984 | Baker et al. |
| 4,518,663 A | 5/1985 | Kodali et al. |
| 4,646,202 A | 2/1987 | Hook et al. |
| 4,701,829 A | 10/1987 | Bricaud et al. |
| 4,777,561 A | 10/1988 | Murphy et al. |
| 4,849,858 A | 7/1989 | Grapes et al. |
| 4,982,785 A | 1/1991 | Tomlinson |
| 4,995,240 A | 2/1991 | Barthel et al. |
| 5,057,968 A | 10/1991 | Morrison |
| 5,071,652 A | 12/1991 | Jones et al. |
| 5,186,250 A | 2/1993 | Ouchi et al. |
| 5,214,564 A | 5/1993 | Metzler et al. |
| 5,270,131 A | 12/1993 | Diethelm et al. |
| 5,322,745 A | 6/1994 | Yanagihara et al. |
| 5,329,988 A | 7/1994 | Juger |
| 5,346,786 A | 9/1994 | Hodgetts |
| 5,356,735 A | 10/1994 | Meadows et al. |
| 5,392,873 A | 2/1995 | Masuyama et al. |
| 5,443,926 A | 8/1995 | Holland et al. |
| 5,510,203 A | 4/1996 | Hamada et al. |
| 5,520,976 A | 5/1996 | Giannetti et al. |
| 5,663,007 A | 9/1997 | Ikoma et al. |
| 5,736,836 A | 4/1998 | Hasegawa et al. |
| 5,756,227 A | 5/1998 | Suzuki et al. |
| 5,937,664 A | 8/1999 | Matsuno et al. |
| 5,985,483 A | 11/1999 | Verhoog et al. |
| 6,087,036 A | 7/2000 | Rouillard et al. |
| 6,111,387 A | 8/2000 | Kouzu et al. |
| 6,159,630 A | 12/2000 | Wyser |
| 6,176,095 B1 | 1/2001 | Porter |
| 6,289,979 B1 | 9/2001 | Kato |
| 6,344,728 B1 | 2/2002 | Kouzu et al. |
| 6,362,598 B2 | 3/2002 | Laig-Horstebrock et al. |
| 6,399,238 B1 | 6/2002 | Oweis et al. |
| 6,422,027 B1 | 7/2002 | Coates, Jr. et al. |
| 6,448,741 B1 | 9/2002 | Inui et al. |
| 6,462,949 B1 | 10/2002 | Parish, IV et al. |
| 6,512,347 B1 | 1/2003 | Hellmann et al. |
| 6,569,556 B2 | 5/2003 | Zhou et al. |
| 6,662,891 B2 | 12/2003 | Misu et al. |
| 6,689,510 B1 | 2/2004 | Gow et al. |
| 6,696,197 B2 | 2/2004 | Inagaki et al. |
| 6,724,172 B2 | 4/2004 | Koo |
| 6,750,630 B2 | 6/2004 | Inoue et al. |
| 6,775,998 B2 | 8/2004 | Yuasa et al. |
| 6,780,538 B2 | 8/2004 | Hamada et al. |
| 6,821,671 B2 | 11/2004 | Hinton et al. |
| 6,826,948 B1 | 12/2004 | Bhatti et al. |
| 6,878,485 B2 | 4/2005 | Ovshinsky et al. |
| 6,982,131 B1 | 1/2006 | Hamada et al. |
| 7,070,874 B2 | 7/2006 | Blanchet et al. |
| 7,143,124 B2 | 11/2006 | Garthwaite |
| 7,150,935 B2 | 12/2006 | Hamada et al. |
| 7,250,741 B2 | 7/2007 | Koo et al. |
| 7,264,902 B2 | 9/2007 | Horie et al. |
| 7,278,389 B2 | 10/2007 | Kirakosyan |
| 7,467,525 B1 | 12/2008 | Ohta et al. |
| 7,531,270 B2 | 5/2009 | Buck et al. |
| 7,591,303 B2 | 9/2009 | Zeigler et al. |
| 7,795,845 B2 | 9/2010 | Cho |
| 7,797,958 B2 | 9/2010 | Alston et al. |
| 7,816,029 B2 | 10/2010 | Takamatsu et al. |
| 7,846,573 B2 | 12/2010 | Kelly |
| 7,879,480 B2 * | 2/2011 | Yoon et al. ............ 429/99 |
| 7,883,793 B2 | 2/2011 | Niedzwiecki et al. |
| 7,976,978 B2 | 7/2011 | Shin et al. |
| 7,981,538 B2 | 7/2011 | Kim et al. |
| 7,997,367 B2 | 8/2011 | Nakamura |
| 8,007,915 B2 | 8/2011 | Kurachi |
| 8,011,467 B2 | 9/2011 | Asao et al. |
| 8,030,886 B2 | 10/2011 | Mahalingam et al. |
| 8,067,111 B2 | 11/2011 | Koetting et al. |
| 8,209,991 B2 | 7/2012 | Kondou et al. |
| 8,409,743 B2 | 4/2013 | Okada et al. |
| 8,663,829 B2 | 3/2014 | Koetting et al. |
| 2002/0012833 A1 | 1/2002 | Gow et al. |
| 2002/0086201 A1 | 7/2002 | Payen et al. |
| 2002/0182493 A1 | 12/2002 | Ovshinsky et al. |
| 2003/0017384 A1 | 1/2003 | Marukawa et al. |
| 2003/0080714 A1 | 5/2003 | Inoue et al. |
| 2003/0189104 A1 | 10/2003 | Watanabe et al. |
| 2003/0211384 A1 | 11/2003 | Hamada et al. |
| 2004/0069474 A1 | 4/2004 | Wu et al. |
| 2004/0121205 A1 | 6/2004 | Blanchet |
| 2005/0026014 A1 | 2/2005 | Fogaing et al. |
| 2005/0089750 A1 | 4/2005 | Ng et al. |
| 2005/0103486 A1 | 5/2005 | Demuth et al. |
| 2005/0110460 A1 | 5/2005 | Arai et al. |
| 2005/0134038 A1 | 6/2005 | Walsh |
| 2006/0234119 A1 | 10/2006 | Kruger et al. |
| 2006/0286450 A1 | 12/2006 | Yoon et al. |
| 2007/0062681 A1 | 3/2007 | Beech |
| 2007/0087266 A1 | 4/2007 | Bourke et al. |
| 2007/0227166 A1 | 10/2007 | Rafalovich et al. |
| 2008/0003491 A1 | 1/2008 | Yahnker et al. |
| 2008/0041079 A1 | 2/2008 | Nishijima et al. |
| 2008/0110189 A1 | 5/2008 | Alston et al. |
| 2008/0110606 A1 | 5/2008 | Gorbounov et al. |
| 2008/0182151 A1 | 7/2008 | Mizusaki et al. |
| 2008/0248338 A1 | 10/2008 | Yano et al. |
| 2008/0299446 A1 | 12/2008 | Kelly |
| 2008/0314071 A1 | 12/2008 | Ohta et al. |
| 2009/0074478 A1 | 3/2009 | Kurachi |
| 2009/0087727 A1 | 4/2009 | Harada et al. |
| 2009/0104512 A1 | 4/2009 | Fassnacht et al. |
| 2009/0123819 A1 | 5/2009 | Kim |
| 2009/0155680 A1 | 6/2009 | Maguire et al. |
| 2009/0186265 A1 * | 7/2009 | Koetting et al. ............ 429/120 |
| 2009/0258288 A1 | 10/2009 | Weber et al. |
| 2009/0258289 A1 | 10/2009 | Weber et al. |
| 2009/0280395 A1 | 11/2009 | Nemesh et al. |
| 2009/0325051 A1 | 12/2009 | Niedzwiecki et al. |
| 2009/0325052 A1 | 12/2009 | Koetting et al. |
| 2009/0325054 A1 | 12/2009 | Payne et al. |
| 2009/0325055 A1 | 12/2009 | Koetting et al. |
| 2009/0325059 A1 | 12/2009 | Niedzwiecki et al. |
| 2010/0112419 A1 | 5/2010 | Jang et al. |
| 2010/0203376 A1 | 8/2010 | Choi et al. |
| 2010/0209760 A1 | 8/2010 | Yoshihara et al. |
| 2010/0262791 A1 | 10/2010 | Gilton |
| 2010/0275619 A1 | 11/2010 | Koetting et al. |
| 2010/0276132 A1 | 11/2010 | Payne |
| 2010/0279152 A1 | 11/2010 | Payne |
| 2010/0279154 A1 | 11/2010 | Koetting et al. |
| 2010/0304203 A1 | 12/2010 | Buck et al. |
| 2010/0307723 A1 | 12/2010 | Thomas et al. |
| 2011/0000241 A1 | 1/2011 | Favaretto |
| 2011/0020676 A1 | 1/2011 | Kurosawa |
| 2011/0027631 A1 | 2/2011 | Koenigsmann |
| 2011/0027640 A1 | 2/2011 | Gadawski et al. |
| 2011/0041525 A1 | 2/2011 | Kim et al. |
| 2011/0045326 A1 | 2/2011 | Leuthner et al. |
| 2011/0052959 A1 | 3/2011 | Koetting et al. |
| 2011/0052960 A1 | 3/2011 | Kwon et al. |
| 2011/0189523 A1 | 8/2011 | Eom |
| 2011/0293982 A1 | 12/2011 | Martz et al. |
| 2011/0293983 A1 | 12/2011 | Oury et al. |
| 2011/0293985 A1 | 12/2011 | Champion et al. |
| 2012/0082880 A1 | 4/2012 | Koetting et al. |
| 2012/0156537 A1 | 6/2012 | Meintschel et al. |
| 2012/0156542 A1 | 6/2012 | Schaefer et al. |
| 2012/0171543 A1 | 7/2012 | Hirsch et al. |
| 2012/0183830 A1 | 7/2012 | Schaefer et al. |
| 2012/0231316 A1 | 9/2012 | Sohn |
| 2013/0045410 A1 | 2/2013 | Yang et al. |
| 2013/0136136 A1 | 5/2013 | Ando et al. |
| 2013/0255293 A1 | 10/2013 | Gadawski et al. |
| 2013/0309542 A1 | 11/2013 | Merriman et al. |
| 2014/0050953 A1 | 2/2014 | Yoon et al. |
| 2014/0050966 A1 | 2/2014 | Merriman et al. |
| 2014/0120390 A1 | 5/2014 | Merriman et al. |
| 2014/0147709 A1 | 5/2014 | Ketkar et al. |
| 2014/0227575 A1 | 8/2014 | Ketkar |

(56) References Cited

U.S. PATENT DOCUMENTS

| | | |
|---|---|---|
| 2014/0308558 A1 | 10/2014 | Merriman et al. |
| 2015/0010801 A1 | 1/2015 | Arena et al. |
| 2015/0111075 A1 | 4/2015 | Yum et al. |
| 2015/0207187 A1 | 7/2015 | Beltz et al. |

FOREIGN PATENT DOCUMENTS

| | | |
|---|---|---|
| CN | 1754279 B | 9/2010 |
| DE | 19639115 A | 3/1998 |
| DE | 102008034860 A1 | 1/2010 |
| DE | 102009006426 A1 | 7/2010 |
| DE | 102010021922 A1 | 12/2011 |
| EP | 1577966 A | 9/2005 |
| EP | 1852925 A | 11/2007 |
| EP | 2065963 A2 | 6/2009 |
| EP | 2200109 A2 | 6/2010 |
| EP | 2262048 A | 12/2010 |
| GB | 481891 A | 3/1938 |
| JP | 08111244 | 4/1996 |
| JP | 09129213 | 5/1997 |
| JP | 19970199186 | 7/1997 |
| JP | 09219213 | 8/1997 |
| JP | 2001105843 A | 4/2001 |
| JP | 2002038033 A | 2/2002 |
| JP | 2002319383 A | 10/2002 |
| JP | 2002333255 A | 11/2002 |
| JP | 2003188323 A | 7/2003 |
| JP | 2003282112 A | 10/2003 |
| JP | 2004333115 A | 11/2004 |
| JP | 2005126315 A | 5/2005 |
| JP | 2005147443 A | 6/2005 |
| JP | 2005349955 A | 12/2005 |
| JP | 2006512731 | 4/2006 |
| JP | 2006125835 | 5/2006 |
| JP | 2006139928 A | 6/2006 |
| JP | 2007107684 | 4/2007 |
| JP | 2007305425 A | 11/2007 |
| JP | 2008054379 A | 3/2008 |
| JP | 2008062875 A | 3/2008 |
| JP | 2008080995 A | 4/2008 |
| JP | 2008159440 A | 7/2008 |
| JP | 2009009889 A | 1/2009 |
| JP | 2009054297 A | 3/2009 |
| KR | 20050092605 A | 9/2005 |
| KR | 100637472 B1 | 10/2006 |
| KR | 100765659 B1 | 10/2007 |
| KR | 20080047641 A | 5/2008 |
| KR | 20090082212 A | 7/2009 |
| KR | 100921346 B1 | 10/2009 |
| KR | 20090107443 A | 10/2009 |
| KR | 20100119497 A | 9/2010 |
| KR | 20100119498 A | 9/2010 |
| KR | 20100115709 A | 10/2010 |
| KR | 20110013269 | 2/2011 |
| KR | 1020110013270 A | 2/2011 |
| KR | 20110126764 A | 11/2011 |
| KR | 20130024761 | 3/2013 |
| WO | 2006083446 A2 | 8/2006 |
| WO | 2006101343 A | 9/2006 |
| WO | 2007007503 A | 1/2007 |
| WO | 2007115743 A2 | 10/2007 |
| WO | 2008111162 A | 9/2008 |
| WO | 2009073225 A | 6/2009 |
| WO | 2011145830 A2 | 11/2011 |
| WO | 2013025608 A1 | 2/2013 |

OTHER PUBLICATIONS

International Search Report; International Application No. PCT/KR2009/000258; International Filing Date: Jan. 16, 2009; Date of Mailing: Aug. 28, 2009; 2 pages.
International Search Report; International Application No. PCT/KR2009/003428, International Filing Date: Jun. 25, 2009; Date of Mailing: Jan. 22, 2010; 2 pages.
International Search Report; International Application No. PCT/KR2009/003429; International Filing Date: Jun. 25, 2009; Date of Mailing: Jan. 12, 2010; 3 pages.
International Search Report; International Application No. PCT/KR2009/003430; International Filing Date: Jun. 25, 2009; Date of Mailing: Feb. 3, 2010; 2 pages.
International Search Report; International Application No. PCT/KR2009/003434; International Filing Date: Jun. 25, 2009; Date of Mailing: Jan. 18, 2010; 2 pages.
International Search Report; International Application No. PCT/KR2009/003436; International Filing Date: Jun. 25, 2009; Date of Mailing: Jan. 22, 2010; 2 pages.
International Search Report; International Application No. PCT/KR2009/006121; International Filing Date: Oct. 22, 2009; Date of Mailing: May 3, 2010; 2 pages.
International Search Report; International Application No. PCT/KR2010/002334; International Filing Date: Apr. 15, 2010; Date of Mailing: Nov. 29, 2010; 2 pages.
International Search Report; International Application No. PCT/KR2010/002336; International Filing Date: Apr. 15, 2010; Date of Mailing: Jan. 31, 2011; 2 pages.
International Search Report; International Application No. PCT/KR2010/002337; International Filing Date: Apr. 15, 2010; Date of Mailing: May 3, 2010; 2 pages.
International Search Report; International Application No. PCT/KR2010/002340; International Filing Date: Apr. 15, 2010; Date of Mailing: Jan. 31, 2011; 2 pages.
International Search Report; International Application No. PCT/KR2010/004944; International Filing Date: Jul. 28, 2010; Date of Mailing: Apr. 29, 2011; 2 pages.
International Search Report; International Application No. PCT/KR2010/005639; International Filing Date: Aug. 24, 2010; Date of Mailing: Jun. 3, 2011; 2 pages.
Thomas J. Gadawski et al., pending U.S. Appl. No. 13/433,649 entitled "Battery System and Method for Cooling the Battery System," filed Mar. 29, 2012.
U.S. Appl. No. 13/475,963 filed on May 19, 2012 entitled Battery Cell Assembly and Method for Manufacturing a Cooling Fin for the Battery Cell Assembly.
U.S. Appl. No. 13/586,960, filed Aug. 16, 2012 entitled Battery Module.
U.S. Appl. No. 13/587,030, filed Aug. 16, 2012 entitled Battery Module and Method for Assembling the Battery Module.
U.S. Appl. No. 13/766,162, filed Feb. 13, 2013 entitled Battery Cell Assembly and Method for Manufacturing the Battery Cell Assembly.
U.S. Appl. No. 13/861,426, filed Apr. 12, 2013 entitled Battery Cell Assembly and Method for Manufacturing a Cooling Fin for the Battery Cell Assembly.
U.S. Appl. No. 13/686,018, filed Nov. 27, 2012 entitled Battery System and Method for Cooling a Battery Cell Assembly.
International Search Report for International application No. PCT/KR2013/004015 dated Sep. 26, 2013.
U.S. Appl. No. 14/273,572, filed May 9, 2014 entitled Battery Pack and Method of Assembling the Battery Pack.
U.S. Appl. No. 14/273,586, filed May 9, 2014 entitled Battery Module and Method of Assembling the Battery Module.
U.S. Appl. No. 14/328,000, filed Jul. 10, 2014 entitled Battery System and Method of Assembling the Battery System.
U.S. Appl. No. 14/330,163, filed Jul. 14, 2014 entitled Battery System and Method for Cooling the Battery System.
U.S. Appl. No. 14/511,389, filed Oct. 10, 2014 entitled Battery Cell Assembly.
U.S. Appl. No. 14/516,667, filed Oct. 17, 2014 entitled Battery Cell Assembly.
U.S. Appl. No. 14/531,696, filed Nov. 3, 2014 entitled Battery Pack.
Written Opinion for International application No. PCT/KR2013002597 dated Feb. 2, 2015.
Written Opinion for International application No. PCT/KR2014/002090 dated May 26, 2014.

* cited by examiner

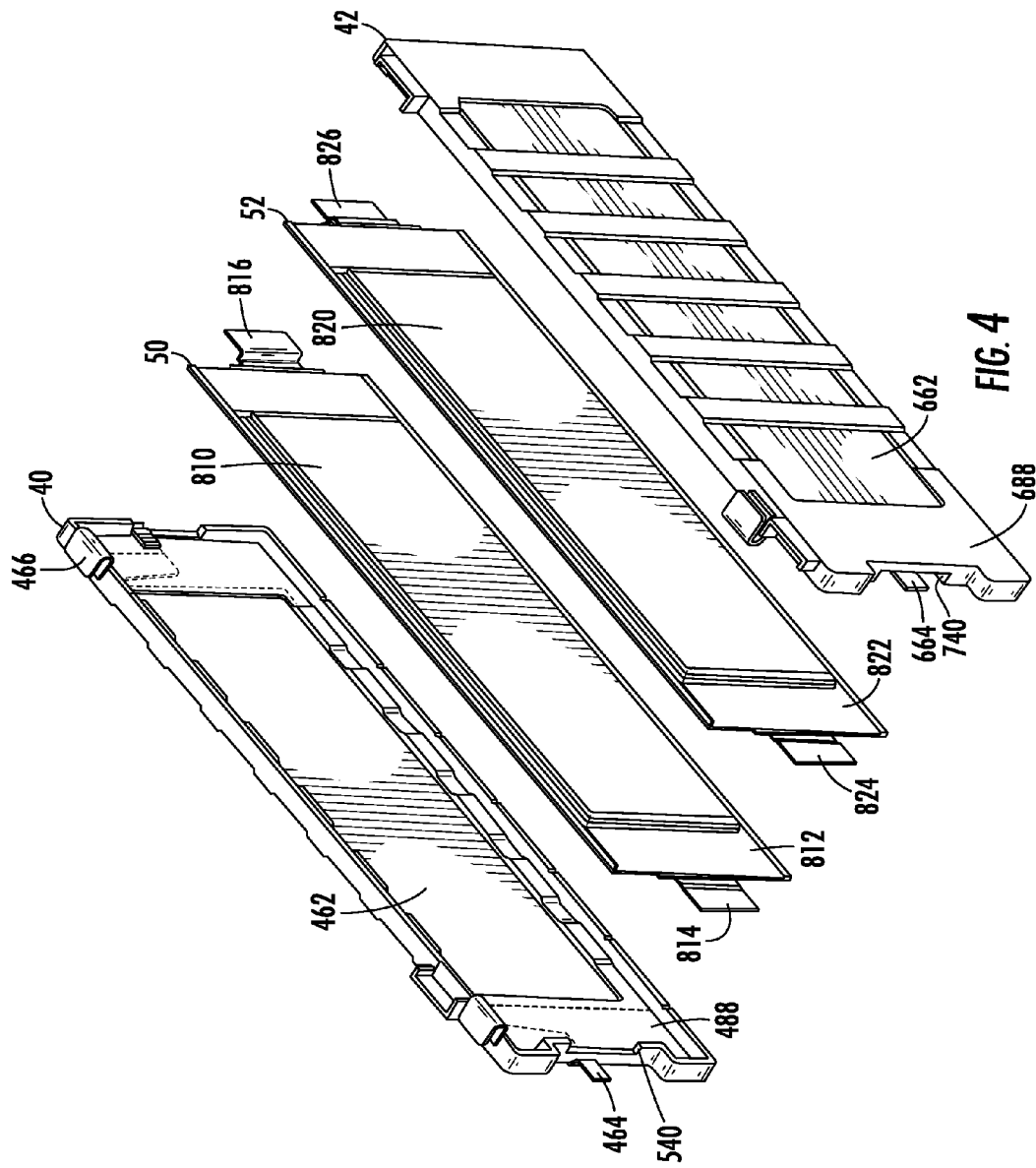

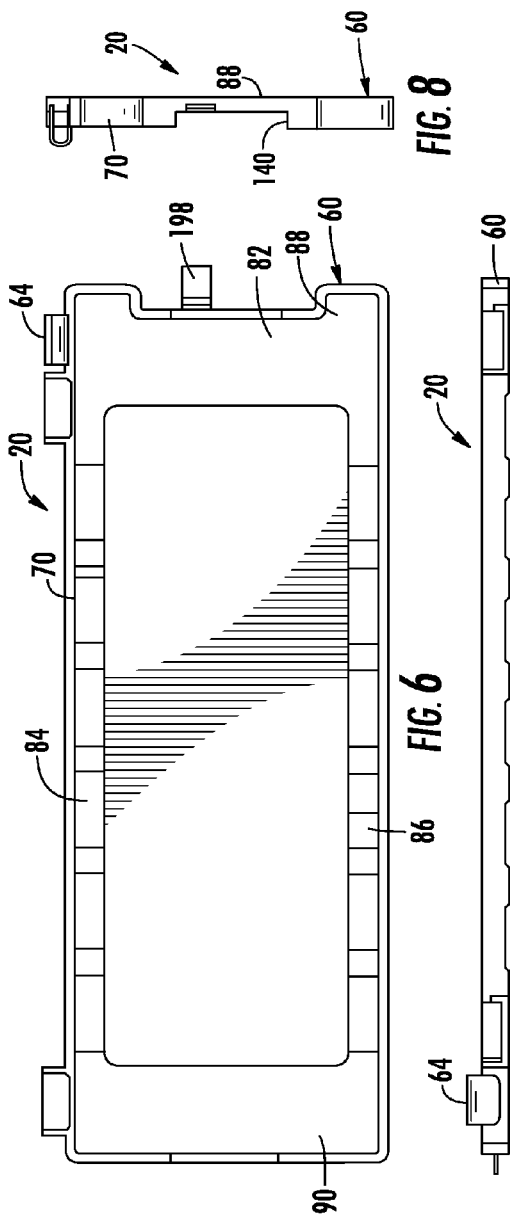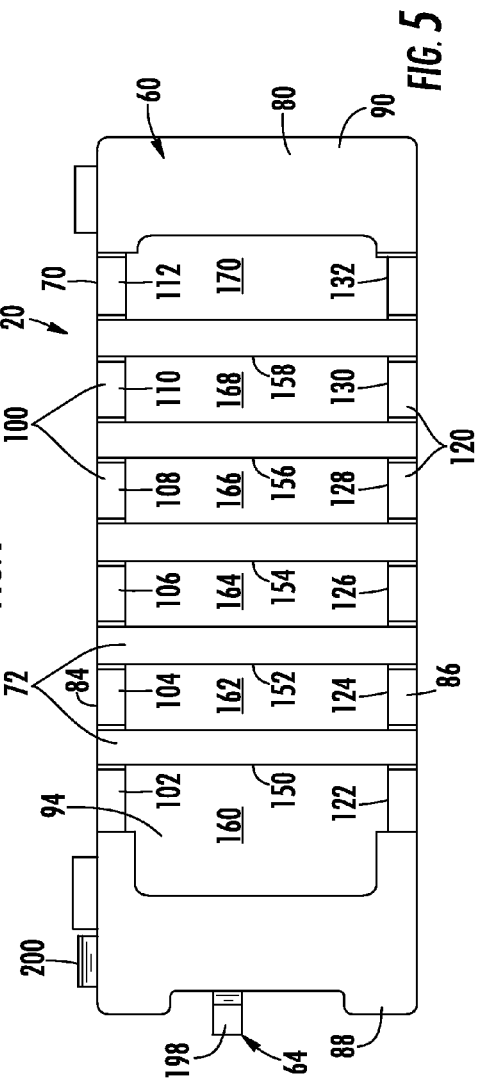

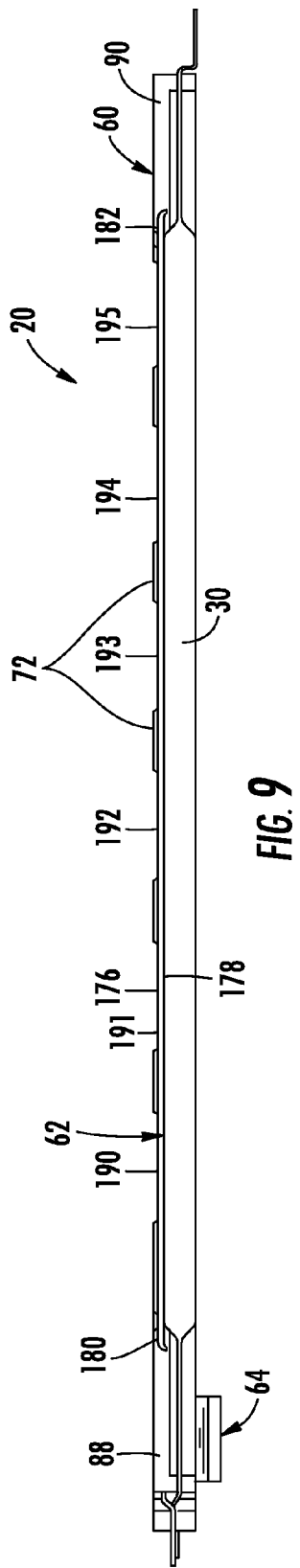

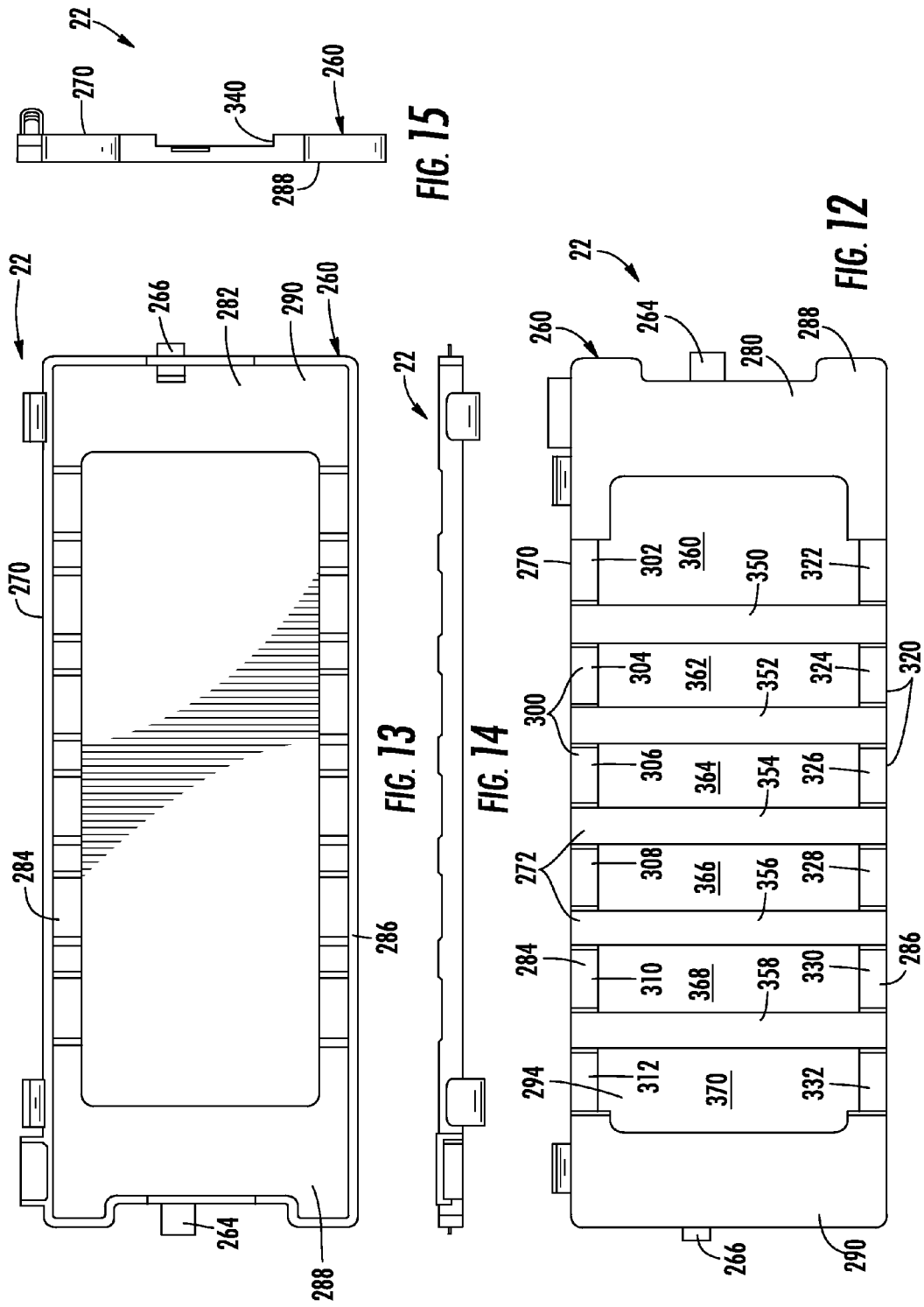

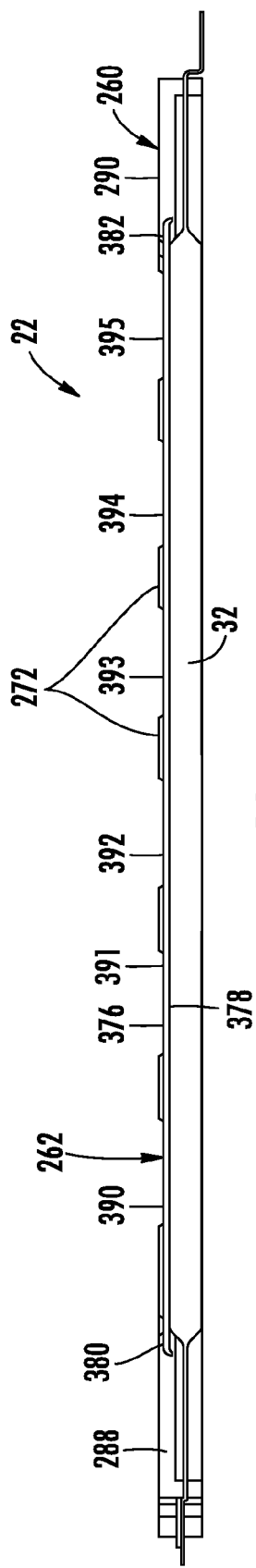

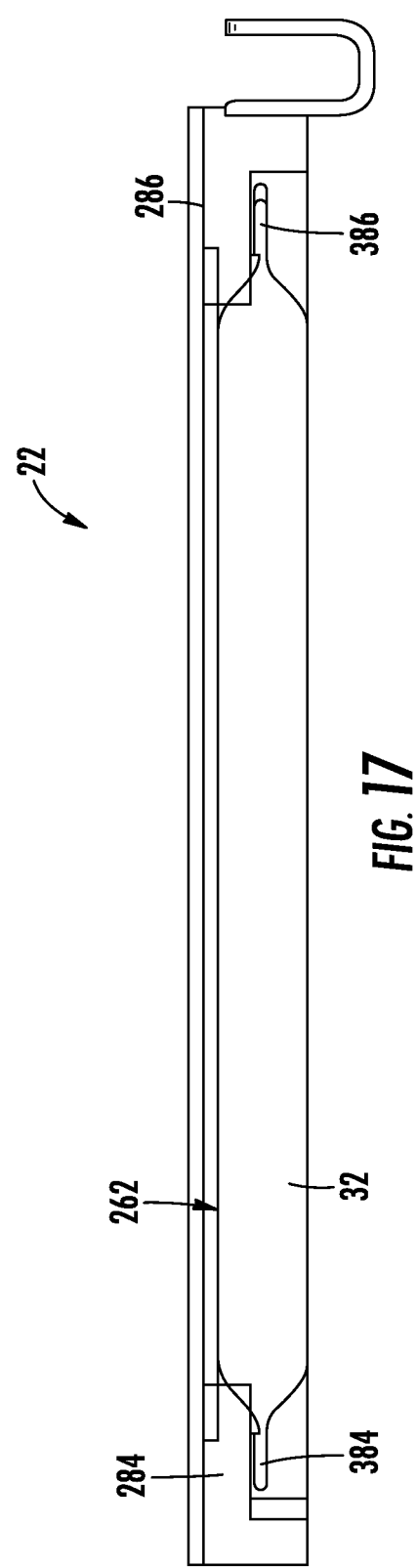

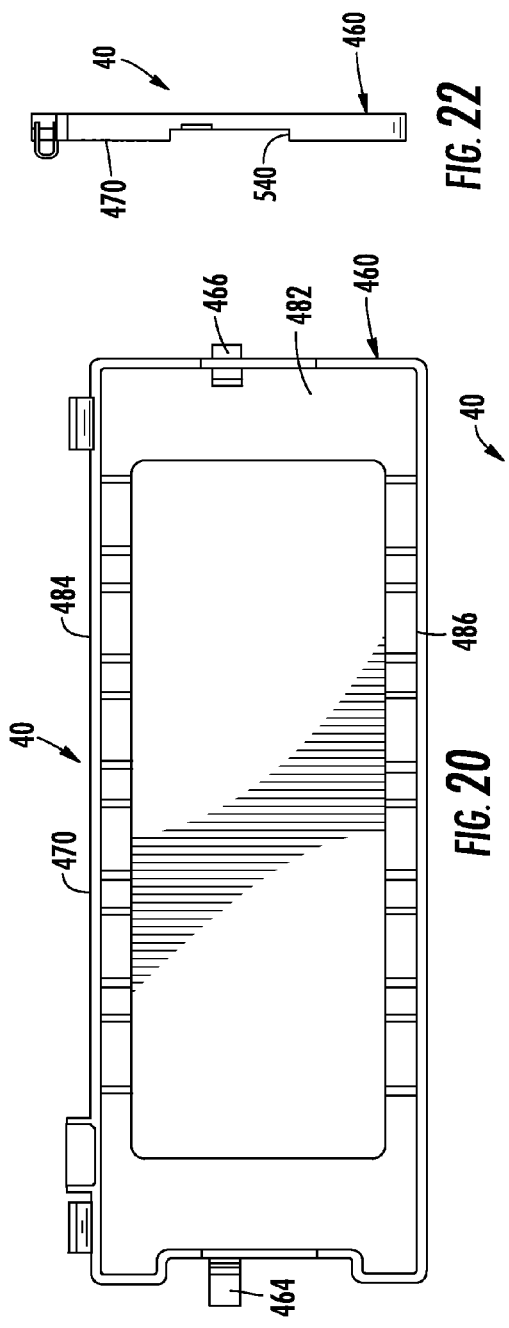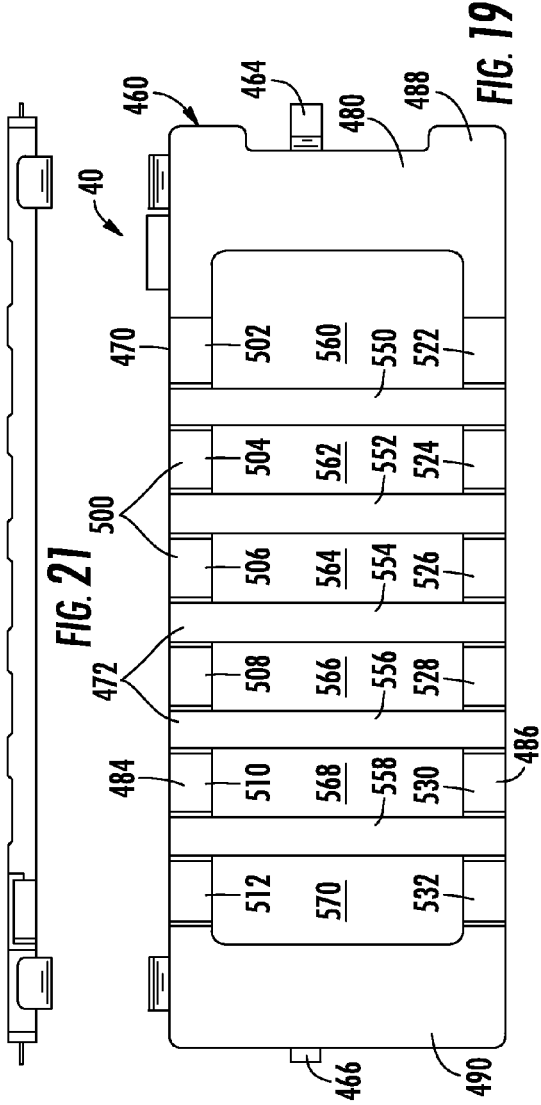

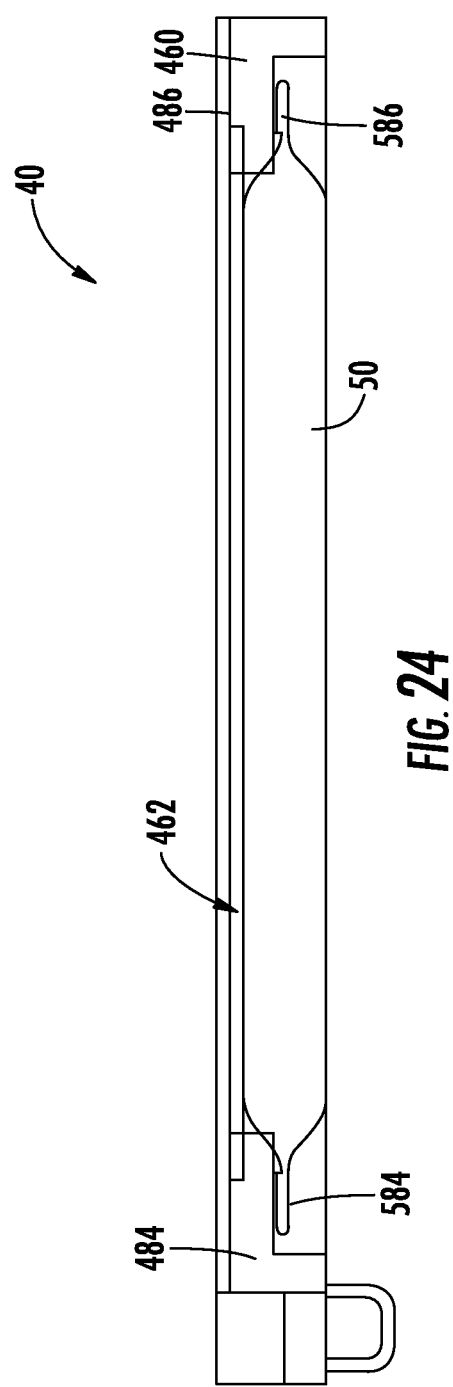

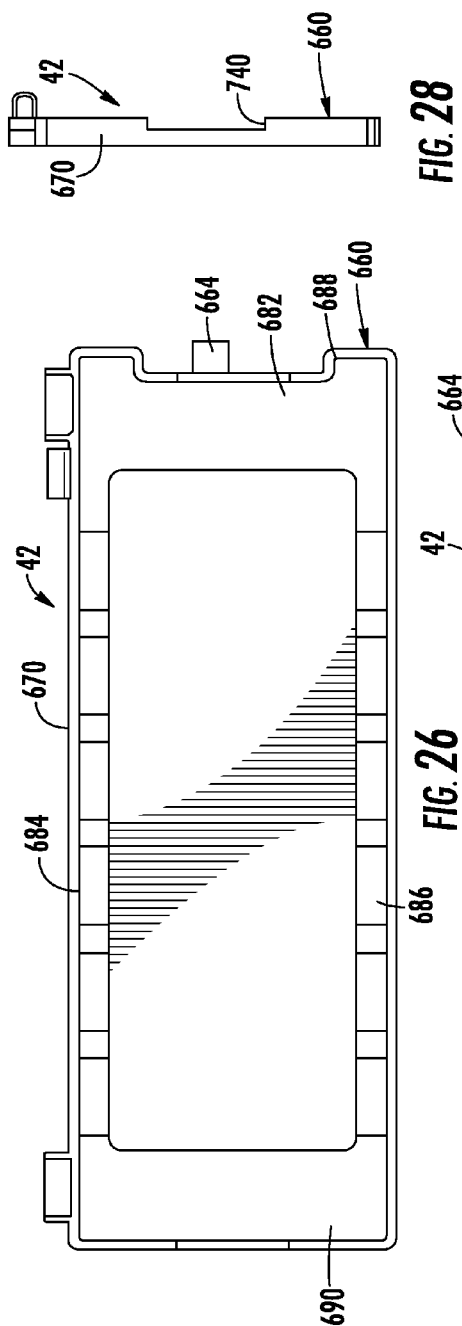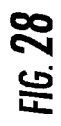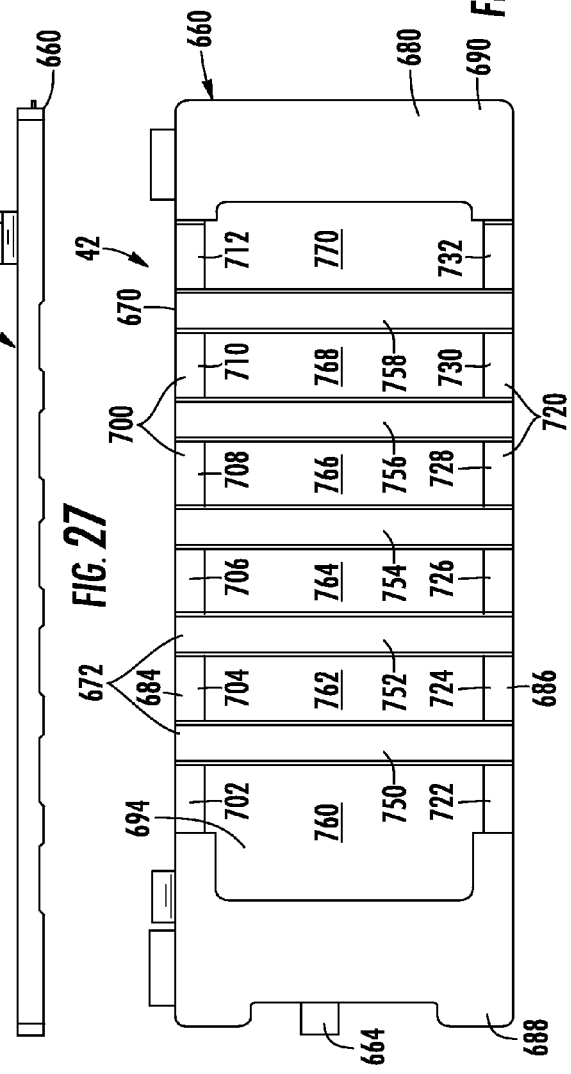

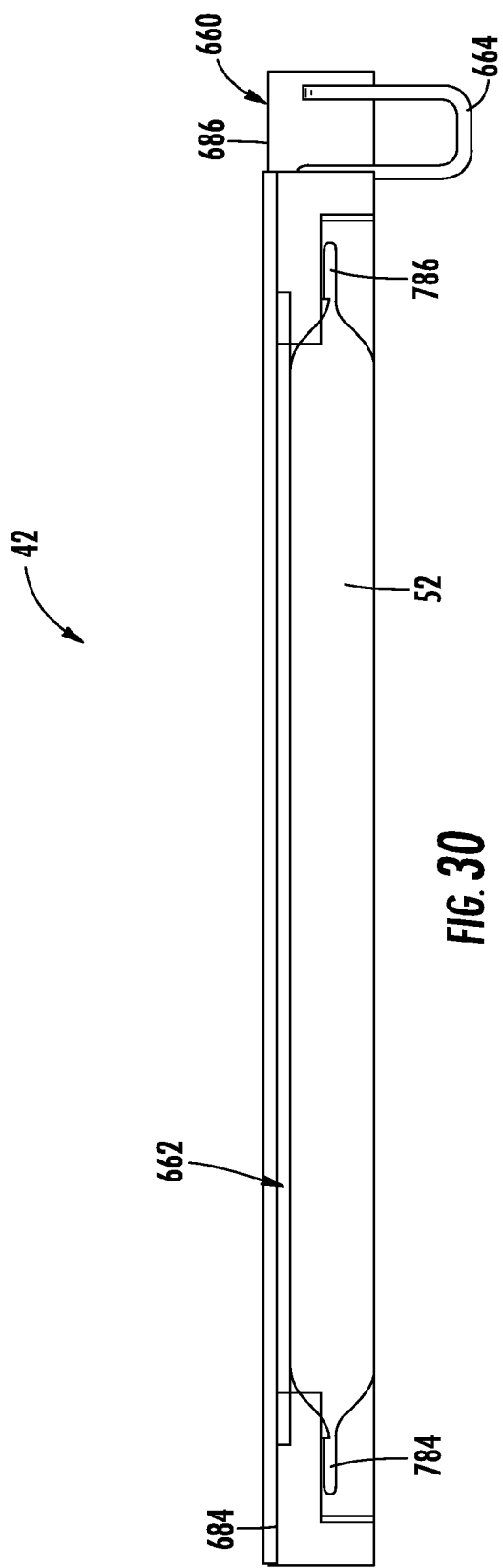

ic frame member of FIG. 12 and a battery cell;
BATTERY ASSEMBLY

BACKGROUND

The inventors herein have recognized a need for an improved battery assembly that is easier to manufacture and has an improved heat dissipating structure.

SUMMARY

A battery assembly in accordance with an exemplary embodiment is provided. The battery assembly includes a first battery frame assembly having a first plastic frame member and a first thermally conductive plate. The first plastic frame member has a first substantially rectangular ring-shaped peripheral wall and a first plurality of cross-members. The first substantially rectangular ring-shaped peripheral wall has first, second, third and fourth wall portions defining a first central space. The first plurality of cross-members extend between the first and second wall portions and extend across the first central space. The first plurality of cross-members define a first plurality of open spaces therebetween in the first central space. The first substantially rectangular ring-shaped peripheral wall further includes a first plurality of channels extending into the first wall portion proximate to the first plurality of open spaces, and a second plurality of channels extending into the second wall portion proximate to the first plurality of open spaces. The first thermally conductive plate has peripheral edges encapsulated within the first substantially rectangular ring-shaped peripheral wall. The first thermally conductive plate further includes exposed portions disposed in the first plurality of open spaces configured to contact air passing through the first plurality of channels and past the first thermally conductive plate and through the second plurality of channels to extract heat energy from the first thermally conductive plate. The battery assembly further includes a first battery cell configured to contact the first thermally conductive plate. The battery assembly further includes a second battery frame assembly configured to be coupled to the first battery frame assembly such that the first battery cell is disposed between the first and second battery frame assemblies.

BRIEF DESCRIPTION OF THE DRAWINGS

FIG. 4 is an exploded view of a third plastic frame member, a fourth plastic frame member, a third battery cell, and a fourth battery cell of the battery assembly of FIG. 1;

FIG. 5 is a view of a first side of a first plastic frame member utilized in the battery assembly of FIG. 1;

FIG. 6 is a view of a second side of the first plastic frame member of FIG. 5;

FIG. 7 is a side view of the first plastic frame member of FIG. 5;

FIG. 8 is an end view of the first plastic frame member of FIG. 5;

FIG. 9 is a cross-sectional view of the first plastic frame member of FIG. 5 and a battery cell;

FIG. 12 is a view of a first side of a second plastic frame member utilized in the battery assembly of FIG. 1;

FIG. 13 is a view of a second side of the second plastic frame member of FIG. 12;

FIG. 14 is a side view of the second plastic frame member of FIG. 12;

FIG. 15 is an end view of the second plastic frame member of FIG. 12;

FIG. 16 is a cross-sectional view of the second plastic frame member of FIG. 12 and a battery cell;

FIG. 17 is another cross-sectional view of the second plastic frame member of FIG. 12 and a battery cell;

FIG. 19 is a view of a first side of a third plastic frame member utilized in the battery assembly of FIG. 1;

FIG. 20 is a view of a second side of the third plastic frame member of FIG. 19;

FIG. 21 is a side view of the third plastic frame member of FIG. 19;

FIG. 22 is an end view of the third plastic frame member of FIG. 19;

FIG. 24 is another cross-sectional view of the third plastic frame member of FIG. 19 and a battery cell;

FIG. 25 is a view of a first side of a fourth plastic frame member utilized in the battery assembly of FIG. 1;

FIG. 26 is a view of a second side of the fourth plastic frame member of FIG. 25;

FIG. 27 is a side view of the fourth plastic frame member of FIG. 25;

FIG. 28 is an end view of the fourth plastic frame member of FIG. 25;

FIG. 30 is another cross-sectional view of the fourth plastic frame member of FIG. 25 and a battery cell.

DETAILED DESCRIPTION

Figure 1:
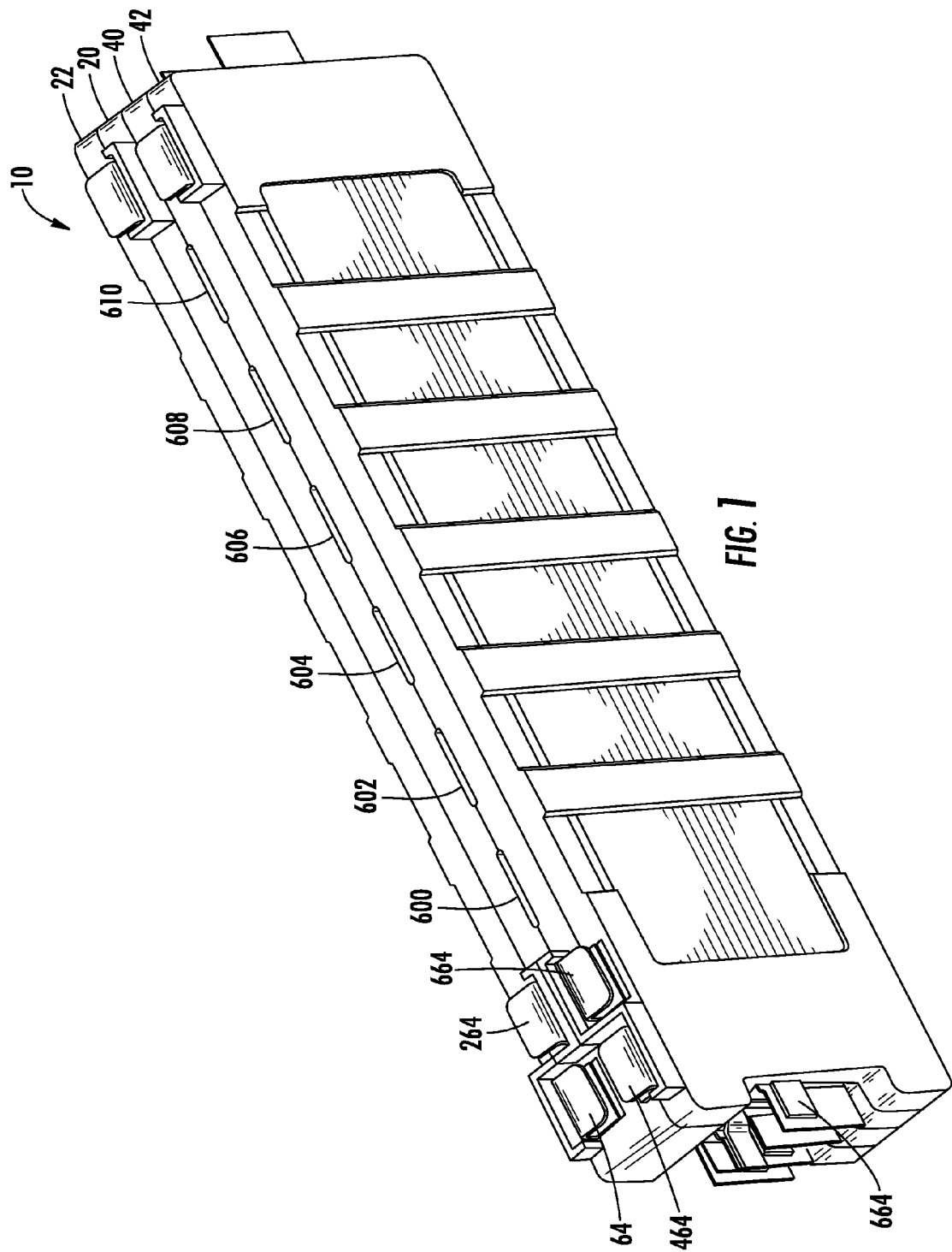
FIG. 1 is a schematic of the battery assembly in accordance with an exemplary embodiment.
Figure 2:
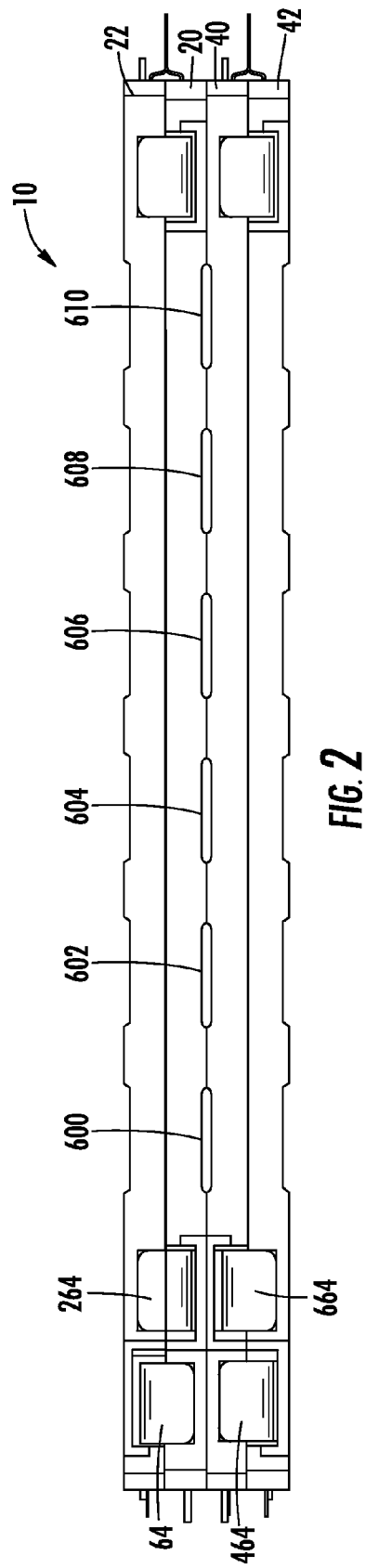
FIG. 2 is a side view of the battery assembly of FIG. 1.

Referring to FIGS. 1-4, a battery assembly 10 in accordance with an exemplary embodiment is provided. The battery assembly 10 includes battery frame assemblies 20, 22, battery cells 30, 32, battery frame assemblies 40, 42, and battery cells 50, 52. An advantage of the battery assembly 10 is that the assembly 10 utilizes a battery frame assembly having a plastic frame member which at least partially encapsulates peripheral edges of a thermally conductive plate therein. As a result, the battery assembly 10 is more easily manufactured than other assemblies, and effectively cools a battery cell disposed against the thermally conductive plate.

The battery frame assemblies 20, 22 are configured to be coupled together and to hold the battery cells 30, 32 therebetween.

Referring to FIGS. 5-11, the battery frame assembly 20 includes a plastic frame member 60, a thermally conductive plate 62, and a bus bar 64. The plastic frame member 60 includes a substantially rectangular ring-shaped peripheral wall 70 and a plurality of cross-members 72. The substantially rectangular ring-shaped peripheral wall 70 includes a first side 80 and a second side 82. The wall 70 further includes first, second, third, and fourth wall portions 84, 86, 88, 90 that define a central space 94 therebetween. The first wall portion 84 is substantially parallel to the second wall portion 86. The third wall portion 88 is substantially parallel to the fourth wall portion 90 and is substantially perpendicular to the first and second wall portions 84, 86.

The plurality of cross-members 72 extend between the first and second wall portions 84, 86 and extend across the central space 94. The plurality of cross-members 72 include cross-members 150, 152, 154, 156, 158. The plurality of cross-members 72 define a plurality of open spaces therebetween in the central space 94. In particular, the plurality of cross-members 72 define open spaces 160, 162, 164, 166, 168, 170 therebetween.

The first wall portion 84 includes a first plurality of channels 100 extending from the first side 80 into the first wall portion 84. In particular, the first plurality of channels 100 include channels 102, 104, 106, 108, 110, 112 extending from the first side 80 into the first wall portion 84 proximate to and fluidly communicating with the open spaces 160, 162, 164, 166, 168, 170, respectively.

The second wall portion 86 includes a second plurality of channels 120 extending from the first side 80 into the second wall portion 86. In particular, the second plurality of channels 120 include channels 122, 124, 126, 128, 130, 132 extending from the first side 80 into the second wall portion 86 proximate to and fluidly communicating with the open spaces 160, 162, 164, 166, 168, 170, respectively.

Figure 3:
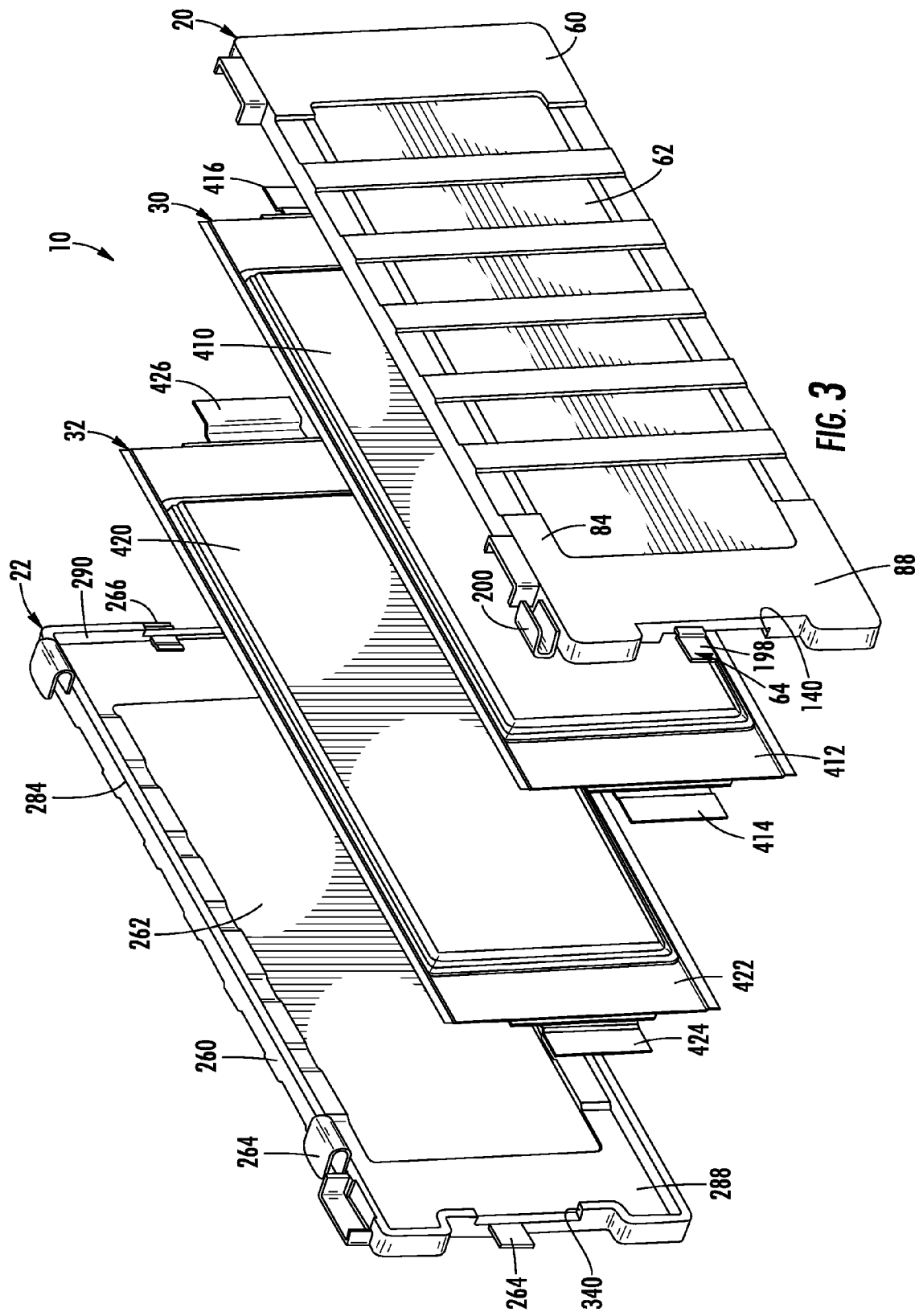
FIG. 3 is an exploded view of a first plastic frame member, a second plastic frame member, a first battery cell, and a second battery cell of the battery assembly of FIG. 1.
Figure 10:
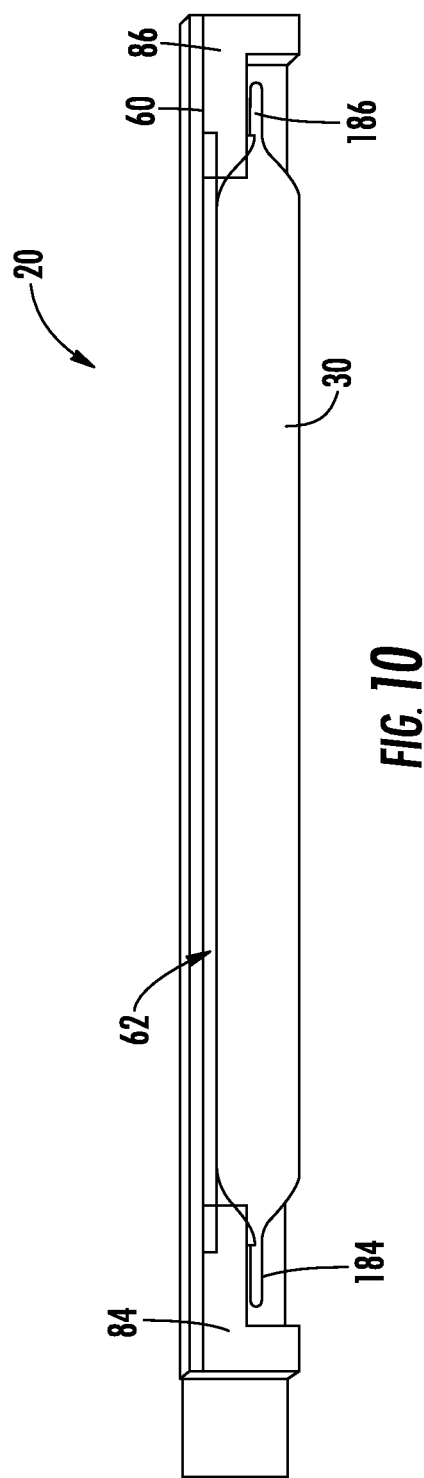
FIG. 10 is another cross-sectional view of the first plastic frame member of FIG. 5 and a battery cell.
Figure 11:
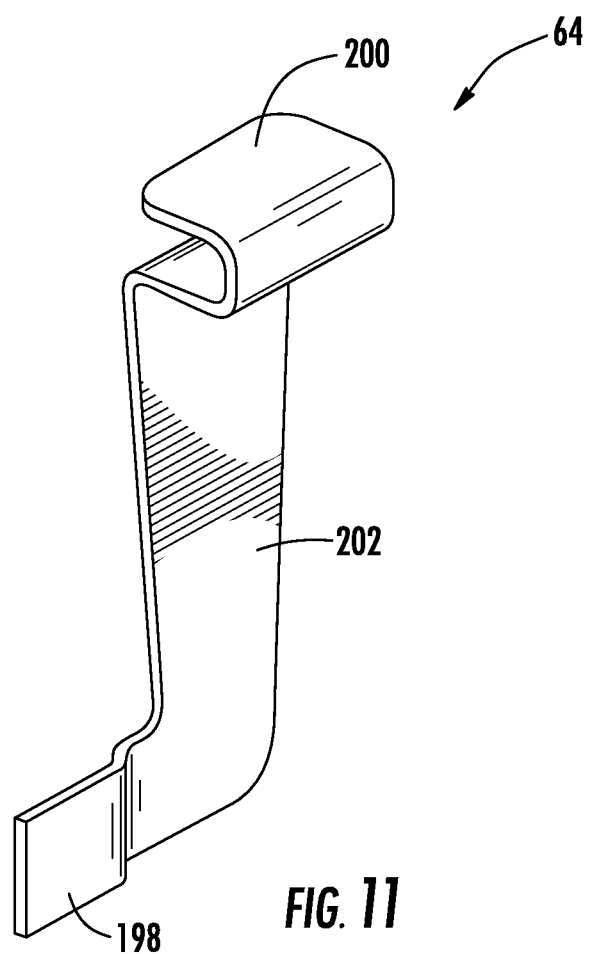
FIG. 11 is a schematic of a bus bar that is partially encapsulated in the first plastic frame member of FIG. 5.

Referring to FIGS. 3, 9 and 10, the thermally conductive plate 62 is configured to extract heat energy from the battery cell 30 disposed against the plate 62 to cool the battery cell 30. The thermally conductive plate 62 is further configured to transfer the heat energy to air flowing past and contacting the plate 62 that subsequently exits the battery assembly 10. In one exemplary embodiment, the thermally conductive plate 62 is constructed of steel. In an alternative embodiment, the thermally conductive plate 62 could be constructed of other thermally conductive materials such as copper, aluminum, or stainless steel for example. The thermally conductive plate 62 includes a first side 176, a second side 178, and peripheral edges 180, 182, 184, 186.

The peripheral edges 180, 182, 184, 186 are encapsulated within the substantially rectangular ring-shaped peripheral wall 70. In particular, referring to FIG. 9, the peripheral edge 180 is encapsulated within the third wall portion 88, and the peripheral edge 182 is encapsulated within the fourth wall portion 90. Further, referring to FIG. 10, the peripheral edge 184 is encapsulated within the first wall portion 84, and the peripheral edge 186 is encapsulated within the second wall portion 86.

Referring to FIGS. 5 and 9, the thermally conductive plate 62 further includes exposed portions 190, 191, 192, 193, 194, 195 disposed in the open spaces 160, 162, 164, 166, 168, 170, respectfully, configured to contact air passing through the channels 102, 104, 106, 108, 110, 112, respectively, and past the thermally conductive plate 62 and through the channels 122, 124, 126, 128, 130, 132, respectively, to extract heat energy from the thermally conductive plate 62.

Referring to FIGS. 1, 3, 5 and 11, the bus bar 64 is electrically coupled to an electrical terminal 414 of the battery cell 30. The bus bar 64 has a tab portion 198, a tab portion 200, and a central body 202. The central body 202 is disposed between the tab portions 198, 200. The central body 202 is disposed within the first and third wall portions 84, 88. The tab portion 198 extends outwardly from the third wall portion 88 and is electrically coupled to the electrical terminal 414 of the battery cell 30. The tab portion 200 extends outwardly from the first wall portion 84, and is configured to be welded to a bus bar 464 in the battery frame assembly 40.

Referring to FIGS. 12-17, the battery frame assembly 22 includes a plastic frame member 260, a thermally conductive plate 262, and a bus bar 264. The plastic frame member 260 includes a substantially rectangular ring-shaped peripheral wall 270 and a plurality of cross-members 272. The substantially rectangular ring-shaped peripheral wall 270 includes a first side 280 and a second side 282. The wall 270 further includes first, second, third, and fourth wall portions 284, 286, 288, 290 that define a central space 294 therebetween. The first wall portion 284 is substantially parallel to the second wall portion 286. The third wall portion 288 is substantially parallel to the fourth wall portion 290 and is substantially perpendicular to the first and second wall portions 284, 286.

The plurality of cross-members 272 extend between the first and second wall portions 284, 286 and extend across the central space 294. The plurality of cross-members 272 include cross-members 350, 352, 354, 356, 358. The plurality of cross-members 272 define a plurality of open spaces therebetween in the central space 294. In particular, the plurality of cross-members 272 define open spaces 360, 362, 364, 366, 368, 370 therebetween.

The first wall portion 284 includes a first plurality of channels 300 extending from the first side 280 into the first wall portion 284. In particular, the first plurality of channels 300 include channels 302, 304, 306, 308, 310, 312 extending from the first side 280 into the first wall portion 284 proximate to and fluidly communicating with the open spaces 360, 362, 364, 366, 368, 370, respectively.

The second wall portion 286 includes a second plurality of channels 320 extending from the first side 280 into the second wall portion 286. In particular, the second plurality of channels 320 include channels 322, 324, 326, 328, 330, 332 extending from the first side 280 into the second wall portion 286 proximate to and fluidly communicating with the open spaces 360, 362, 364, 366, 368, 370, respectively.

Referring to FIGS. 3, 16 and 17, the thermally conductive plate 262 is configured to extract heat energy from the battery cell 32 disposed against the plate 262 to cool the battery cell 32. The thermally conductive plate 262 is further configured to transfer the heat energy to air flowing past and contacting the plate 262 that subsequently exits the battery assembly 10. In one exemplary embodiment, the thermally conductive plate 262 is constructed of steel. In an alternative embodiment, the thermally conductive plate 262 could be constructed of other thermally conductive materials such as copper, aluminum, or stainless steel for example. The thermally conductive plate 262 includes a first side 376, a second side 378, and peripheral edges 380, 382, 384, 386.

The peripheral edges 380, 382, 384, 386 are encapsulated within the substantially rectangular ring-shaped peripheral wall 270. In particular, referring to FIG. 16, the peripheral edge 380 is encapsulated within the third wall portion 288, and the peripheral edge 382 is encapsulated within the fourth wall portion 290. Further, referring to FIG. 17, the peripheral edge 384 is encapsulated within the first wall portion 284, and the peripheral edge 386 is encapsulated within the second wall portion 286.

Referring to FIGS. 12 and 16, the thermally conductive plate 262 further includes exposed portions 390, 391, 392, 393, 394, 395 disposed in the open spaces 360, 362, 364, 366, 368, 370, respectfully, configured to contact air passing through the channels 302, 304, 306, 308, 310, 312, respectively, and past the thermally conductive plate 262 and through the channels 322, 324, 326, 328, 330, 332, respectively, to extract heat energy from the thermally conductive plate 262.

Referring to FIGS. 3 and 12, the bus bar 264 is electrically coupled to an electrical terminal 424 of the battery cell 32. The bus bar 264 has a structure identical to a structure of the bus bar 64 described above. A tab of the bus bar 264 is configured to be welded to another bus bar (not shown) in another battery frame assembly.

Figure 18:
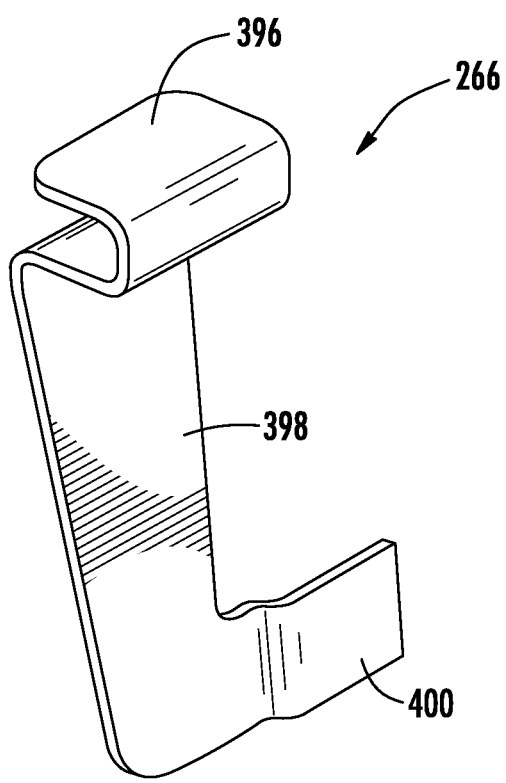
FIG. 18 is a schematic of a current sense member partially encapsulated within the second plastic frame member of FIG. 12.

Referring to FIGS. 3 and 18, the current sense member 266 is electrically coupled to an electrical terminal 426 of the battery cell 32. The current sense member 266 has a current sense lead 396, a central body 398, and a current sense lead 400. The central body 398 is disposed between the current sense leads 396, 400. The central body 398 is disposed within the first and fourth wall portions 284, 290. The current sense lead 400 extends outwardly from the fourth wall portion 290 and is electrically coupled to the electrical terminal 426 of the battery cell 32. Also, the current sense lead 396 extends outwardly from the first wall portion 284 and is configured to be welded to another current sense lead (not shown).

Referring to FIGS. 3 and 6, the battery cell 30 is disposed against the second side 82 of the substantially rectangular ring-shaped peripheral wall 70 of the plastic frame member 60. The battery cell 30 includes a body portion 410, a peripheral lip portion 412, and electrical terminals 414, 416. The peripheral lip portion 412 extends around a periphery of the body portion 410. The electrical terminal 414 extends outwardly from a first end of the peripheral lip portion 412 and is electrically coupled to an active element within the body portion 410. The electrical terminal 414 further extends through an aperture formed by the adjacent channels 140, 340 formed in the battery frame assemblies 20, 22, respectively. The electrical terminal 416 extends outwardly from a second end of the peripheral lip portion 412 and is electrically coupled to the active element within the body portion 410. The electrical terminal 416 further extends through an aperture formed by the adjacent channels formed in the battery frame assemblies 20, 22, respectively. The electrical terminal 414 is electrically coupled to the bus bar 64. The electrical terminal 416 is electrically coupled to the electrical terminal 426 of the battery cell 32. During operation, the battery cell 30 generates a voltage between the electrical terminals 414, 416. Further, during operation, the body portion 410 contacts the thermally conductive plate 62 which extracts heat energy from the body portion 410 of the battery cell 30 to cool the battery cell 30. In an exemplary embodiment, the battery cell 30 is a lithium-ion pouch-type battery cell. Of course, in an alternative embodiment, the battery cell 30 could be another type of battery cell such as a nickel metal hydride battery cell for example.

Referring to FIGS. 3 and 13, the battery cell 32 is disposed against the second side 282 of the substantially rectangular ring-shaped peripheral wall 270 of the plastic frame member 260. The battery cell 32 includes a body portion 420, a peripheral lip portion 422, and electrical terminals 424, 426. The peripheral lip portion 422 extends around a periphery of the body portion 420. The electrical terminal 424 extends outwardly from a first end of the peripheral lip portion 422 and is electrically coupled to an active element within the body portion 420. The electrical terminal 424 further extends through an aperture formed by the adjacent channels 140, 340 formed in the battery frame assemblies 20, 22, respectively. The electrical terminal 426 extends outwardly from a second end of the peripheral lip portion 422 and is electrically coupled to the active element within the body portion 420. The electrical terminal 426 further extends through an aperture formed by the adjacent channels formed in the battery frame assemblies 20, 22, respectively. The electrical terminal 424 is electrically coupled to the bus bar 264. The electrical terminal 426 is electrically coupled to the electrical terminal 416 of the battery cell 30. During operation, the battery cell 32 generates a voltage between the electrical terminals 424, 426. Further, during operation, the body portion 420 contacts the thermally conductive plate 262 which extracts heat energy from the body portion 420 of the battery cell 32 to cool the battery cell 32. In an exemplary embodiment, the battery cell 32 is a lithium-ion pouch-type battery cell. Of course, in an alternative embodiment, the battery cell 32 could be another type of battery cell such as a nickel metal hydride battery cell for example.

The battery frame assemblies 40, 42 are configured to be coupled together and to hold the battery cells 50, 52 therebetween.

Referring to FIGS. 4 and 19-24, the battery frame assembly 40 includes a plastic frame member 460, a thermally conductive plate 462, and a bus bar 464. The plastic frame member 460 includes a substantially rectangular ring-shaped peripheral wall 470 and a plurality of cross-members 472. The substantially rectangular ring-shaped peripheral wall 470 includes a first side 480 and a second side 482. The wall 470 further includes first, second, third, and fourth wall portions 484, 486, 488, 490 that define a central space 494 therebetween. The first wall portion 484 is substantially parallel to the second wall portion 486. The third wall portion 488 is substantially parallel to the fourth wall portion 490 and is substantially perpendicular to the first and second wall portions 484, 486.

The plurality of cross-members 472 extend between the first and second wall portions 484, 486 and extend across the central space 494. The plurality of cross-members 472 include cross-members 550, 552, 554, 556, 558. The plurality of cross-members 472 define a plurality of open spaces therebetween in the central space 494. In particular, the plurality of cross-members 472 define open spaces 560, 562, 564, 566, 568, 570 therebetween.

The first wall portion 484 includes a first plurality of channels 500 extending from the first side 480 into the first wall portion 484. In particular, the first plurality of channels 500 include channels 502, 504, 506, 508, 510, 512 extending from the first side 480 into the first wall portion 484 proximate to and fluidly communicating with the open spaces 560, 562, 564, 566, 568, 570, respectively.

The second wall portion 486 includes a second plurality of channels 520 extending from the first side 480 into the second wall portion 486. In particular, the second plurality of channels 520 include channels 522, 524, 526, 528, 530, 532 extending from the first side 480 into the second wall portion 486 proximate to and fluidly communicating with the open spaces 560, 562, 564, 566, 568, 570, respectively.

Figure 23:
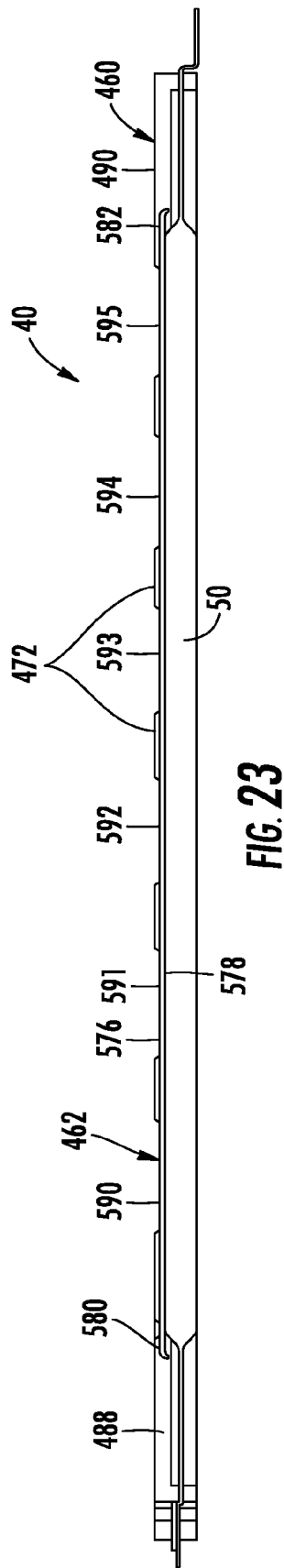
FIG. 23 is a cross-sectional view of the third plastic frame member of FIG. 19 and a battery cell.

Referring to FIGS. 4, 23 and 24, the thermally conductive plate 462 is configured to extract heat energy from the battery cell 50 disposed against the plate 462 to cool the battery cell 50. The thermally conductive plate 462 is further configured to transfer the heat energy to air flowing past and contacting the plate 462 that subsequently exits the battery assembly 10. In one exemplary embodiment, the thermally conductive plate 462 is constructed of steel. In an alternative embodiment, the thermally conductive plate 462 could be constructed of other thermally conductive materials such as copper, aluminum, or stainless steel for example. The thermally conductive plate 462 includes a first side 576, a second side 578, and peripheral edges 580, 582, 584, 586.

The peripheral edges 580, 582, 584, 586 are encapsulated within the substantially rectangular ring-shaped peripheral wall 470. In particular, referring to FIG. 23, the peripheral edge 580 is encapsulated within the third wall portion 488, and the peripheral edge 582 is encapsulated within the fourth wall portion 490. Further, referring to FIG. 24, the peripheral edge 584 is encapsulated within the first wall portion 484, and the peripheral edge 586 is encapsulated within the second wall portion 486.

Referring to FIGS. 19 and 23, the thermally conductive plate 462 further includes exposed portions 590, 591, 592, 593, 594, 595 disposed in the open spaces 560, 562, 564, 566, 568, 570, respectfully, configured to contact air passing through the channels 502, 504, 506, 508, 510, 512, respectively, and past the thermally conductive plate 462 and through the channels 522, 524, 526, 528, 530, 532, respectively, to extract heat energy from the thermally conductive plate 462.

Referring to FIGS. 1, 4 and 19, the bus bar 464 is electrically coupled to an electrical terminal 814 of the battery cell 50. The bus bar 464 has a structure identical to a structure of the bus bar 64 described above. A tab of the bus bar 464 is configured to be welded to the bus bar 64 of the battery frame assembly 20.

Referring to FIG. 4, the current sense member 466 is electrically coupled to an electrical terminal 816 of the battery cell 50. The structure of the current sense member 466 is identical to a structure of the current sense member 266 discussed above.

Referring to FIGS. 1, 2, 4 and 5, the battery frame assemblies 20, 40 define the flow paths 600, 602, 604, 606, 608, 610 therethrough for receiving air that flows through the flow paths to extract heat energy from the thermally conductive plates 62, 462.

The flow path 600 is defined by the channel 102, the exposed portion 190 in the open space 160, the channel 122 of the battery frame assembly 20. The flow path 600 is further defined by the channel 502, the exposed portion 590 in the open space 560, the channel 522 of the battery frame assembly 40.

The flow path 602 is defined by the channel 104, the exposed portion 191 in the open space 162, the channel 124 of the battery frame assembly 20. The flow path 602 is further defined by the channel 504, the exposed portion 591 in the open space 562, the channel 524 of the battery frame assembly 40.

The flow path 604 is defined by the channel 106, the exposed portion 192 in the open space 164, the channel 126 of the battery frame assembly 20. The flow path 604 is further defined by the channel 506, the exposed portion 592 in the open space 564, the channel 526 of the battery frame assembly 40.

The flow path 606 is defined by the channel 108, the exposed portion 193 in the open space 166, the channel 128 of the battery frame assembly 20. The flow path 606 is further defined by the channel 508, the exposed portion 593 in the open space 566, the channel 528 of the battery frame assembly 40.

The flow path 608 is defined by the channel 110, the exposed portion 194 in the open space 168, the channel 130 of the battery frame assembly 20. The flow path 608 is further defined by the channel 510, the exposed portion 594 in the open space 568, the channel 530 of the battery frame assembly 40.

The flow path 610 is defined by the channel 112, the exposed portion 195 in the open space 170, the channel 132 of the battery frame assembly 20. The flow path 610 is further defined by the channel 512, the exposed portion 595 in the open space 570, the channel 532 of the battery frame assembly 40.

Referring to FIGS. 1, 4 and 25-30, the battery frame assembly 42 includes a plastic frame member 660, a thermally conductive plate 662, and a bus bar 664. The plastic frame member 660 includes a substantially rectangular ring-shaped peripheral wall 670 and a plurality of cross-members 672. The substantially rectangular ring-shaped peripheral wall 670 includes a first side 680 and a second side 682. The wall 670 further includes first, second, third, and fourth wall portions 684, 686, 688, 690 that define a central space 694 therebetween. The first wall portion 684 is substantially parallel to the second wall portion 686. The third wall portion 688 is substantially parallel to the fourth wall portion 690 and is substantially perpendicular to the first and second wall portions 684, 686.

The plurality of cross-members 672 extend between the first and second wall portions 684, 686 and extend across the central space 694. The plurality of cross-members 672 include cross-members 750, 752, 754, 756, 758. The plurality of cross-members 672 define a plurality of open spaces therebetween in the central space 694. In particular, the plurality of cross-members 672 define open spaces 760, 762, 764, 766, 768, 770 therebetween.

The first wall portion 684 includes a first plurality of channels 700 extending from the first side 680 into the first wall portion 684. In particular, the first plurality of channels 700 include channels 702, 704, 706, 708, 710, 712 extending from the first side 680 into the first wall portion 684 proximate to and fluidly communicating with the open spaces 760, 762, 764, 766, 768, 770, respectively.

The second wall portion 686 includes a second plurality of channels 720 extending from the first side 680 into the second wall portion 686. In particular, the second plurality of channels 720 include channels 722, 724, 726, 728, 730, 732 extending from the first side 680 into the second wall portion 686 proximate to and fluidly communicating with the open spaces 760, 762, 764, 766, 768, 770, respectively.

Figure 29:
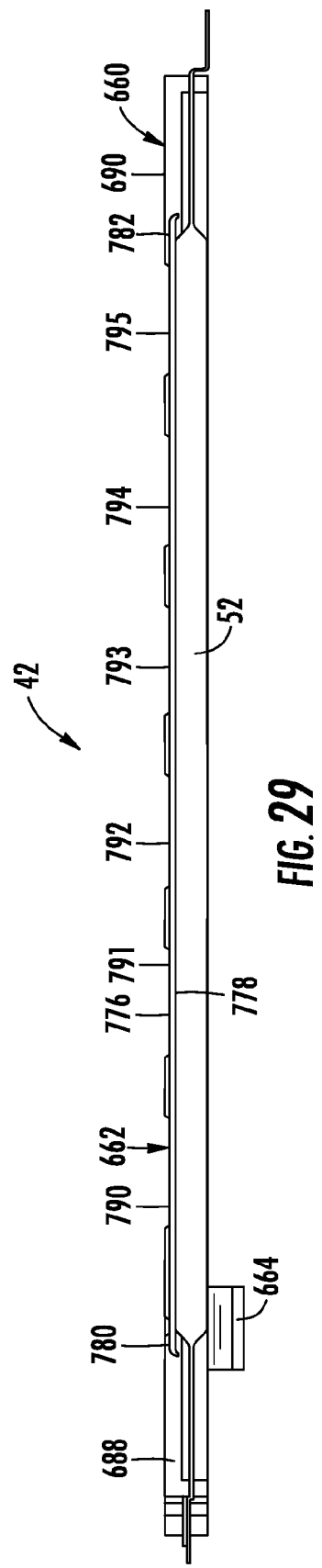
FIG. 29 is a cross-sectional view of the fourth plastic frame member of FIG. 25 and a battery cell.

Referring to FIGS. 4, 29 and 30, the thermally conductive plate 662 is configured to extract heat energy from the battery cell 52 disposed against the plate 662 to cool the battery cell 52. The thermally conductive plate 662 is further configured to transfer the heat energy to air flowing past and contacting the plate 662 that subsequently exits the battery assembly 10. In one exemplary embodiment, the thermally conductive plate 662 is constructed of steel. In an alternative embodiment, the thermally conductive plate 662 could be constructed of other thermally conductive materials such as copper, aluminum, or stainless steel for example. The thermally conductive plate 662 includes a first side 776, a second side 778, and peripheral edges 780, 782, 784, 786.

The peripheral edges 780, 782, 784, 786 are encapsulated within the substantially rectangular ring-shaped peripheral wall 670. In particular, referring to FIG. 29, the peripheral edge 780 is encapsulated within the third wall portion 688, and the peripheral edge 782 is encapsulated within the fourth wall portion 690. Further, referring to FIG. 30, the peripheral edge 784 is encapsulated within the first wall portion 684, and the peripheral edge 786 is encapsulated within the second wall portion 686.

Referring to FIGS. 25 and 29, the thermally conductive plate 662 further includes exposed portions 790, 791, 792, 793, 794, 795 disposed in the open spaces 760, 762, 764, 766, 768, 770, respectfully, configured to contact air passing through the channels 702, 704, 706, 708, 710, 712, respectively, and past the thermally conductive plate 662 and through the channels 722, 724, 726, 728, 730, 732, respectively, to extract heat energy from the thermally conductive plate 662.

Referring to FIGS. 1 and 4, the bus bar 664 is electrically coupled to an electrical terminal 824 of the battery cell 52. The bus bar 664 has a structure identical to a structure of the bus bar 64 described above. A tab of the bus bar 664 is configured to be welded to another bus bar of another battery frame assembly.

Referring to FIGS. 4 and 20, the battery cell 50 is disposed against the second side 482 of the substantially rectangular ring-shaped peripheral wall 470 of the plastic frame member 460. The battery cell 50 includes a body portion 810, a peripheral lip portion 812, and electrical terminals 814, 816. The peripheral lip portion 812 extends around a periphery of the body portion 810. The electrical terminal 814 extends outwardly from a first end of the peripheral lip portion 812 and is electrically coupled to an active element within the body portion 810. The electrical terminal 814 further extends through an aperture formed by the adjacent channels 540, 740 formed in the battery frame assemblies 40, 42, respectively. The electrical terminal 816 extends outwardly from a second end of the peripheral lip portion 812 and is electrically coupled to the active element within the body portion 810. The electrical terminal 816 further extends through an aperture formed by the adjacent channels formed in the battery frame assemblies 40, 42, respectively. The electrical terminal 814 is electrically coupled to the bus bar 464. The electrical terminal 816 is electrically coupled to the electrical terminal 826 of the battery cell 52. During operation, the battery cell 50 generates a voltage between the electrical terminals 814, 816. Further, during operation, the body portion 810 contacts the thermally conductive plate 462 which extracts heat energy from the body portion 810 of the battery cell 50 to cool the battery cell 50. In an exemplary embodiment, the battery cell 50 is a lithium-ion pouch-type battery cell. Of course, in an alternative embodiment, the battery cell 50 could be another type of battery cell such as a nickel metal hydride battery cell for example.

Referring to FIGS. 4 and 26, the battery cell 52 is disposed against the second side 682 of the substantially rectangular ring-shaped peripheral wall 670 of the plastic frame member 660. The battery cell 52 includes a body portion 820, a peripheral lip portion 822, and electrical terminals 824, 826. The peripheral lip portion 822 extends around a periphery of the body portion 820. The electrical terminal 824 extends outwardly from a first end of the peripheral lip portion 822 and is electrically coupled to an active element within the body portion 820. The electrical terminal 824 further extends through an aperture formed by the adjacent channels 540, 740 formed in the battery frame assemblies 40, 42, respectively. The electrical terminal 826 extends outwardly from a second end of the peripheral lip portion 822 and is electrically coupled to the active element within the body portion 820. The electrical terminal 826 further extends through an aperture formed by the adjacent channels formed in the battery frame assemblies 40, 42, respectively. The electrical terminal 824 is electrically coupled to the bus bar 664. The electrical terminal 826 is electrically coupled to the electrical terminal 816 of the battery cell 50. During operation, the battery cell 52 generates a voltage between the electrical terminals 824, 826. Further, during operation, the body portion 820 contacts the thermally conductive plate 662 which extracts heat energy from the body portion 820 of the battery cell 52 to cool the battery cell 52. In an exemplary embodiment, the battery cell 52 is a lithium-ion pouch-type battery cell. Of course, in an alternative embodiment, the battery cell 52 could be another type of battery cell such as a nickel metal hydride battery cell for example.

The battery assembly provides a substantial advantage over other battery assemblies. In particular, the battery assembly utilizes a battery frame assembly having a plastic frame member which at least partially encapsulates peripheral edges of a thermally conductive plate therein. As a result, the battery assembly 10 is more easily manufactured than other assemblies, and effectively cools a battery cell disposed against the thermally conductive plate.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A battery assembly, comprising:
a first battery frame assembly having a first plastic frame member and a first thermally conductive plate;
the first plastic frame member having a first substantially rectangular ring-shaped peripheral wall and a first plurality of cross-members; the first substantially rectangular ring-shaped peripheral wall having first, second, third and fourth wall portions defining a first central space, the first plurality of cross-members extending between the first and second wall portions and extending across the first central space, the first plurality of cross-members defining a first plurality of open spaces therebetween in the first central space; the first substantially rectangular ring-shaped peripheral wall further having a first plurality of channels extending into the first wall portion proximate to the first plurality of open spaces, and a second plurality of channels extending into the second wall portion proximate to the first plurality of open spaces;
the first thermally conductive plate having first, second, third and fourth peripheral edges being disposed and encapsulated within the first, second, third and fourth wall portions, respectively, of the first substantially rectangular ring-shaped peripheral wall, the first thermally conductive plate having first and second sides, the first plurality of cross-members being disposed directly on an contacting the first side of the first thermally conductive plate, the first thermally conductive plate further having exposed portions on the first side thereof disposed in the first plurality of open spaces configured to contact air flowing through the first plurality of channels and past the first side of the first thermally conductive plate and through the second plurality of channels to extract heat energy from the first thermally conductive plate;
a first battery cell being disposed directly on and contacting the second side of the first thermally conductive plate;
a second battery cell being disposed directly on and contacting the first battery cell;
a second battery frame assembly being coupled to the first battery frame assembly such that the first and second battery cells are disposed between the first and second battery frame assemblies, the second battery frame assembly having a second plastic frame member and a second thermally conductive plate, the second thermally conductive plate having first, second, third and fourth peripheral edges disposed and encapsulated within the second plastic frame member, the second thermally conductive plate having first and second sides, the first side of the second thermally conductive plate being disposed directly on and contacting the second battery cell such that the first and second battery cells are disposed directly between the first and second thermally conductive plates; and a second plurality of cross-members of the second plastic frame member being disposed directly on and contacting the second side of the second thermally conductive plate.

2. The battery assembly of claim 1, wherein the first and second battery cells are further disposed between the first battery frame assembly and the second battery frame assembly, the first plastic frame member being coupled to the second plastic frame member.

3. The battery assembly of claim 1, wherein the second plastic frame member further includes a second substantially rectangular ring-shaped peripheral wall; the second substantially rectangular ring-shaped peripheral wall having first, second, third and fourth wall portions defining a second central space, the second plurality of cross-members extending between the first and second wall portions of the second substantially rectangular ring-shaped peripheral wall and extending across the second central space, the second plurality of cross-members defining a second plurality of open spaces therebetween in the second central space, the second substantially rectangular ring-shaped peripheral wall further having a first plurality of channels extending into the first wall portion thereof proximate to the second plurality of open spaces, and a second plurality of channels extending into the second wall portion thereof proximate to the second plurality of open spaces.

4. The battery assembly of claim 3, wherein the second thermally conductive plate further having exposed portions disposed in the second plurality of open spaces configured to contact air passing through the first plurality of channels in the first wall portion of the second substantially rectangular ring-shaped peripheral wall and past the second thermally conductive plate and through the second plurality of channels in the second wall portion of the second substantially rectangular ring-shaped peripheral wall to extract heat energy from the second thermally conductive plate.

5. The battery assembly of claim 3, further comprising:
a first bus bar having a first tab portion, a second tab portion, and a first central body; the first central body of the first bus bar being disposed between the first and second tab portions of the first bus bar; and
the first central body of the first bus bar being disposed within the first substantially rectangular ring-shaped peripheral wall, the first tab portion of the first bus bar extending outwardly from the first substantially rectangular ring-shaped peripheral wall in a first direction, and the second tab portion of the first bus bar extending outwardly from the first substantially rectangular ring-shaped peripheral wall in a second direction perpendicular to the first direction, the first tab portion of the first bus bar being electrically coupled to a first electrical terminal of the first battery cell;
a second bus bar having a first tab portion, a second tab portion, and a first central body; the first central body of the second bus bar being disposed between the first and second tab portions of the second bus bar; and
the first central body of the second bus bar being disposed within the second substantially rectangular ring-shaped peripheral wall, the first tab portion of the second bus bar extending outwardly from the second substantially rectangular ring-shaped peripheral wall in the first direction, and the second tab portion of the second bus bar extending outwardly from the second substantially rectangular ring-shaped peripheral wall in a third direction opposite of the second direction, the first tab portion of the second bus bar being electrically coupled to a second electrical terminal of the second battery cell.

6. The battery assembly of claim 3, further comprising:
a third battery frame assembly having a third plastic frame member and a third thermally conductive plate;
the third plastic frame member having a third substantially rectangular ring-shaped peripheral wall and a plurality of cross-members; the third substantially rectangular ring-shaped peripheral wall having first, second, third and fourth wall portions defining a central space, the plurality of cross-members of the third plastic frame member extending between the first and second wall portions of the third substantially rectangular ring-shaped peripheral wall and extending across the central space thereof, the plurality of cross-members of the third plastic frame member defining a plurality of open spaces therebetween in the central space of the third substantially rectangular ring-shaped peripheral wall,
the third substantially rectangular ring-shaped peripheral wall further having a third plurality of channels extending into the first wall portion thereof proximate to the plurality of open spaces defined by the plurality of cross-members of the third plastic frame member, and a fourth plurality of channels extending into the second wall portion thereof proximate to the plurality of open spaces defined by the plurality of cross-members of the third plastic frame member;
the third thermally conductive plate having peripheral edges encapsulated within the third substantially rectangular ring-shaped peripheral wall;
a fourth battery frame assembly having a fourth plastic frame member and a fourth thermally conductive plate, the fourth thermally conductive plate having peripheral edges encapsulated in the fourth plastic frame member; and
third and fourth battery cells disposed between the third battery frame assembly and the fourth battery frame assembly such that the third thermally conductive plate contacts the third battery cell, and the fourth thermally conductive plate contacts the fourth battery cell, the third plastic frame member being coupled between and to the first and fourth plastic frame members.

7. The battery assembly of claim 6, wherein each channel of the first plurality of channels is disposed adjacent to a respective channel of the third plurality of channels, and each channel of the second plurality of channels is disposed adjacent to a respective channel of the fourth plurality of channels; each respective combination of a channel of the first plurality of channels, a channel of the second plurality of channels, a channel of the third plurality of channels, and a channel of the fourth plurality of channels define a flow path.

8. The battery assembly of claim 2, wherein the first and second plastic frame members have first and second channels, respectively, that extend into the first and second plastic frame members, respectively, that are disposed proximate to one another such that first and second electrical terminals, respectively, of the first and second battery cells, respectively, extend through an aperture formed by the first and second channels.

9. The battery assembly of claim 1, wherein the first wall portion and the second wall portion of the first substantially rectangular ring-shaped peripheral wall being substantially parallel to one another; the third wall portion and the fourth wall portion of the first substantially rectangular ring-shaped peripheral wall being substantially parallel to one another and substantially perpendicular to the first and second wall portions.

10. The battery assembly of claim 1, further comprising:
a first bus bar have a first tab portion, a second tab portion, and a first central body; the first central body being disposed between the first and second tab portions; and
the first central body being disposed within the first and third wall portions, the first tab portion extending outwardly from the first wall portion, and the second tab portion extending outwardly from the first wall portion, the first tab portion being electrically coupled to a first electrical terminal of the first battery cell.

11. The battery assembly of claim 1, further comprising:
a first current sense member having a first current sense lead, a second current sense lead, and a central body; the central body of the first current sense member being disposed between the first and second current sense leads; and
the central body of the first current sense member being disposed within the first and fourth wall portions, the first current sense lead extending outwardly from the first wall portion, and the second current sense lead extending outwardly from the fourth wall portion.

12. The battery assembly of claim 1, wherein the first plurality of cross-members of the first plastic frame member being substantially parallel to one another and substantially perpendicular to the first and second wall portions of the first substantially rectangular ring-shaped peripheral wall.

13. A battery assembly, comprising:
a first battery frame assembly having a first plastic frame member and a first thermally conductive plate;
the first plastic frame member having a first substantially rectangular ring-shaped peripheral wall; the first substantially rectangular ring-shaped peripheral wall having first, second, third and fourth wall portions defining a first central space;
the first thermally conductive plate having first, second, third and fourth peripheral edges being disposed and encapsulated within the first, second, third and fourth wall portions, respectively, of the first substantially rectangular ring-shaped peripheral wall, the first thermally conductive plate having first and second sides, the first thermally conductive plate further having an exposed portion on the first side thereof disposed in the first central space of the first substantially rectangular ring-shaped peripheral wall configured to contact air flowing past the first side of the first thermally conductive plate to extract heat energy from the first thermally conductive plate;
a first battery cell being disposed on and directly contacting the second side of the first thermally conductive plate;
a second battery cell being disposed on and directly contacting the first battery cell; and
a second battery frame assembly being coupled to the first battery frame assembly such that the first and second battery cells are disposed between the first and second battery frame assemblies; the second battery frame assembly having a second plastic frame member and a second thermally conductive plate;
the second plastic frame member having a second substantially rectangular ring-shaped peripheral wall; the second substantially rectangular ring-shaped peripheral wall having first, second, third and fourth wall portions defining a second central space;
the second thermally conductive plate having first, second, third and fourth peripheral edges being disposed and encapsulated within the first, second, third and fourth wall portions, respectively, of the second substantially rectangular ring-shaped peripheral wall, the second thermally conductive plate having first and second sides, the first side of the second thermally conductive plate being disposed on and directly contacting the second battery cell such that the first and second battery cells are disposed directly between the first and second thermally conductive plates.

14. The battery assembly of claim 13, wherein:
the first substantially rectangular ring-shaped peripheral wall having at least a first cross-member extending between and coupled to the first and second wall portions of the first substantially rectangular ring-shaped peripheral wall and extending across the first central space; the first cross-member being disposed on and directly contacting the first thermally conductive plate;
the first cross-member defining a first open space between the first cross-member and the first wall portion of the first substantially rectangular ring-shaped peripheral wall in the first central space;
the first cross-member further defining a second open space between the first cross-member and the second wall portion of the first substantially rectangular ring-shaped peripheral wall in the first central space;
the first wall portion of the first substantially rectangular ring-shaped peripheral wall having first and second channels extending therein that fluidly communicate with the first and second open spaces, respectively,
the second wall portion of the first substantially rectangular ring-shaped peripheral wall having third and fourth channels extending therein that fluidly communicate with the second open space; and
the first thermally conductive plate having a first exposed portion disposed in the first open space configured to contact air passing through the first and third channels; and
the first thermally conductive plate further having a second exposed portion disposed in the second open space configured to contact air passing through the second and fourth channels to extract heat energy from the first thermally conductive plate.

* * * * *